(12) United States Patent
Amano

(10) Patent No.: US 8,126,644 B2
(45) Date of Patent: Feb. 28, 2012

(54) TRAVEL SUPPORT SYSTEM, METHOD THEREOF, PROGRAM THEREOF, AND RECORDING MEDIUM CONTAINING THE PROGRAM

(75) Inventor: Kouji Amano, Tokyo (JP)

(73) Assignees: Pioneer Corporation, Tokyo (JP); Increment P Corporation, Tokyo (JP)

(*) Notice: Subject to any disclaimer, the term of this patent is extended or adjusted under 35 U.S.C. 154(b) by 717 days.

(21) Appl. No.: 12/282,227

(22) PCT Filed: Mar. 8, 2007

(86) PCT No.: PCT/JP2007/054510
§ 371 (c)(1),
(2), (4) Date: Oct. 8, 2008

(87) PCT Pub. No.: WO2007/105583
PCT Pub. Date: Sep. 20, 2007

(65) Prior Publication Data
US 2009/0210145 A1    Aug. 20, 2009

(30) Foreign Application Priority Data
Mar. 10, 2006    (JP) .................................. 2006-066376

(51) Int. Cl.
  G01C 21/26    (2006.01)
  G08G 1/137    (2006.01)
(52) U.S. Cl. .................... 701/211; 701/201; 340/995.12; 340/995.19; 340/995.2

(58) Field of Classification Search .................... None
See application file for complete search history.

(56) References Cited

U.S. PATENT DOCUMENTS

| | | | | |
|---|---|---|---|---|
| 5,787,383 A | * | 7/1998 | Moroto et al. ................ | 701/210 |
| 6,321,158 B1 | * | 11/2001 | DeLorme et al. ............. | 701/201 |
| 2004/0260458 A1 | * | 12/2004 | Park et al. ..................... | 701/200 |
| 2005/0119826 A1 | * | 6/2005 | Lee et al. ...................... | 701/209 |
| 2006/0089798 A1 | * | 4/2006 | Kaufman et al. ............. | 701/211 |
| 2007/0150179 A1 | * | 6/2007 | Pinkus et al. ................. | 701/208 |

FOREIGN PATENT DOCUMENTS

| | | |
|---|---|---|
| JP | 2000-146603 | 5/2000 |
| JP | 2003-344070 A1 | 12/2003 |
| JP | 2004-257818 A1 | 9/2004 |
| JP | 2005-147697 A1 | 6/2005 |

* cited by examiner

*Primary Examiner* — Michael J. Zanelli
(74) *Attorney, Agent, or Firm* — Kratz, Quintos & Hanson, LLP

(57) ABSTRACT

A PC of a travel support system displays running video of a predetermined route, and if a predetermined intersection is set as a warning point by a user, sends warning point setting information to a server. If the server acquires the warning point setting information from the PC, the server updates a user DB. A navigational device sends travel route related information of a travel route set by the user to the server. The server sends detailed guidance information of the warning point included in the traveling route set in the navigational device to the navigational device. Upon arrival at the warning point, the navigational device notifies detailed guidance, and upon arrival at an existing guidance point, the navigational device notifies existing guidance.

21 Claims, 20 Drawing Sheets

TRAVEL SUPPORT SYSTEM, METHOD THEREOF, PROGRAM THEREOF, AND RECORDING MEDIUM CONTAINING THE PROGRAM

TECHNICAL FIELD

The present invention relates to a travel support system for supporting travel of a traveling body, a method thereof, a program thereof, and a recording medium on which the program is recorded.

BACKGROUND ART

Conventionally, an arrangement for supporting travel of a traveling body is known, in which information of complicated details of intersections can be provided (see, e.g., Patent Document 1).

Patent Document 1 discloses a route detection display device which extracts intersections on a route where guidance is desired and determines whether the intersections are complicated. Subsequently, if an enlarged display of the intersection which has been determined to be complicated is selected, an enlarged intersection figure of the intersection is drawn. In addition, contours of roads forming the intersections and a direction showing a travelling direction, for example, are drawn.

Patent Document 1: JP-A-2000-146603 (page 5, left column to page 6, left column)

DISCLOSURE OF THE INVENTION

Problems to Be Solved by the Invention

However, in the above-mentioned arrangement disclosed in Patent Document 1, because the enlarged figure of the intersections extracted by the route detection display device is displayed, detailed information such as an enlarged figure concerning an intersection that is felt complicated for a specific user may not be notified.

An object of the invention is to provide a travel support system for supporting travel of a traveling body, a method thereof, a program thereof, and a recording medium on which the program is recorded, in view of the above circumstances.

Means for Solving the Problems

A travel support system according to an aspect of the present invention is a travel support system including: a terminal; and a server connected to the terminal in a manner capable of communicating information with the terminal via a network, the server controlling the travel support system to notify information concerning an intersection through which a traveling body is allowed to travel, the terminal including: a location state information acquirer that acquires location state information concerning a state of a predetermined location; a location state information display controller that controls a location state display to display the location state information having been acquired; a detailed guidance intersection information generator that, when the detailed guidance intersection information generator recognizes that a predetermined one of the intersection indicated by the location state information is set, based on an input manipulation, as a first intersection for which detailed guidance information concerning detailed guidance is notified, generates detailed guidance intersection information telling that the predetermined one of the intersection is set, based on the input manipulation, as the first intersection and sends the detailed guidance intersection information to the server; a current position information acquirer that acquires current position information concerning a current position of the traveling body; a destination information acquirer that acquires destination information concerning a position of a destination to which the traveling body travels; a traveling route related information acquirer that acquires traveling route related information concerning a traveling route including the current position and the destination and sends the traveling route related information to the server; a detailed guidance information acquirer that acquires the detailed guidance information of the first intersection sent from the server and included in the traveling route of the traveling route related information; an existing guidance information acquirer that acquires existing guidance information concerning the guidance of a second intersection that is included in the traveling route of the traveling route related information and set in advance to notify a more simplified guidance than a guidance of the detailed guidance information; a traveling state determining unit that determines a traveling state of the traveling body based on the current position information and the traveling route related information, and a terminal notification controller that controls a terminal notifier to notify the detailed guidance information when the traveling state determining unit determines that the current position of the traveling body is in the vicinity of the first intersection, and controls the terminal notifier to notify the existing guidance information when the traveling state determining unit determines that the current position is in the vicinity of the second intersection, and the server including: a first server information acquirer that acquires the detailed guidance intersection information sent from the terminal; a second server information acquirer that acquires the detailed route related information sent from the terminal; a server storage that stores the detailed guidance information; and a detailed guidance information selector that, when the detailed guidance information selector recognizes that the first intersection that corresponds to the detailed guidance intersection information is included in the traveling route of the traveling route related information, selects the detailed guidance information of the first intersection from the server storage and sends the detailed guidance information of the first intersection to the terminal.

A travel support method according to another aspect of the present invention is a travel support method by a computer with a terminal and a server connected to the terminal in a manner capable of communicating information therebetween via a network, the server controlling notification to a traveling body of information on an intersection through which the traveling body is allowed to travel, the method comprising steps instructed by the computer, the steps including: instructing the terminal to acquire location state information concerning a state of a predetermined location, to control a location state display to display the location state information having been acquired to generate, when k is recognized that a predetermined one of the intersection indicated by the location state information is set, based on an input manipulation, as a first intersection where detailed guidance information concerning detailed guidance is notified, detailed guidance intersection information telling that the predetermined one of the intersection is set, based on the input manipulation, as the first intersection and send the detailed guidance intersection information to the server, to acquire current position information concerning a current position of the traveling body, to acquire destination information concerning a position of a destination to which the traveling body travels, to acquire traveling route related information concerning a traveling route including the current position and the destination and send the traveling route related information to the server, to acquire the detailed guidance information of the first intersection sent from the server and included in the traveling route of the traveling route related information; to acquire existing guidance information concerning the guidance of a second intersection that is included in the traveling route of the traveling route related information and set in advance to notify a more simplified guidance than a guidance of the detailed guidance information, to determine a traveling state of the traveling body based on the current position information and the traveling route related information, and to control a terminal notifier to notify the detailed guidance information when it is determined that the current position of the traveling body is in the vicinity of the first intersection, and control the terminal notifier to notify the existing guidance information when it is determined that the current position is in the vicinity of the second intersection; and instructing the server to acquire the detailed guidance intersection information sent from the terminal, to acquire the traveling route related information sent from the terminal, and to select, when it is recognized that the first intersection that corresponds to the detailed guidance intersection information is included in the traveling route of the traveling route related information, the detailed guidance information of the first intersection from the server storage and send the detailed guidance information of the first intersection to the terminal.

A travel support program according to another aspect of the present invention is a travel support program in which the travel support program instructs the computer to execute the travel support method according to aforementioned aspect of the present invention.

A recording medium on which a travel support program is recorded according to another aspect of the present invention is a recording medium on which a travel support program is recorded, in which the travel support program according to the aforementioned aspect of the present invention is readably recorded on the recording medium.

BEST MODE FOR CARRYING OUT THE INVENTION

An embodiment of the invention will be described below with reference to the drawings. In the embodiment, an arrangement of a travel support system of the invention in which a traveling status (in the form of running) of a traveling body such as a vehicle is navigated will be described as an example. Note that a travel support system of the invention is not limited to an arrangement in which traveling of a vehicle is navigated, but is applied to an arrangement in which traffic status of any traveling body is notified. For example, the invention can be applied to a portable device that a user carries.

Figure 1:
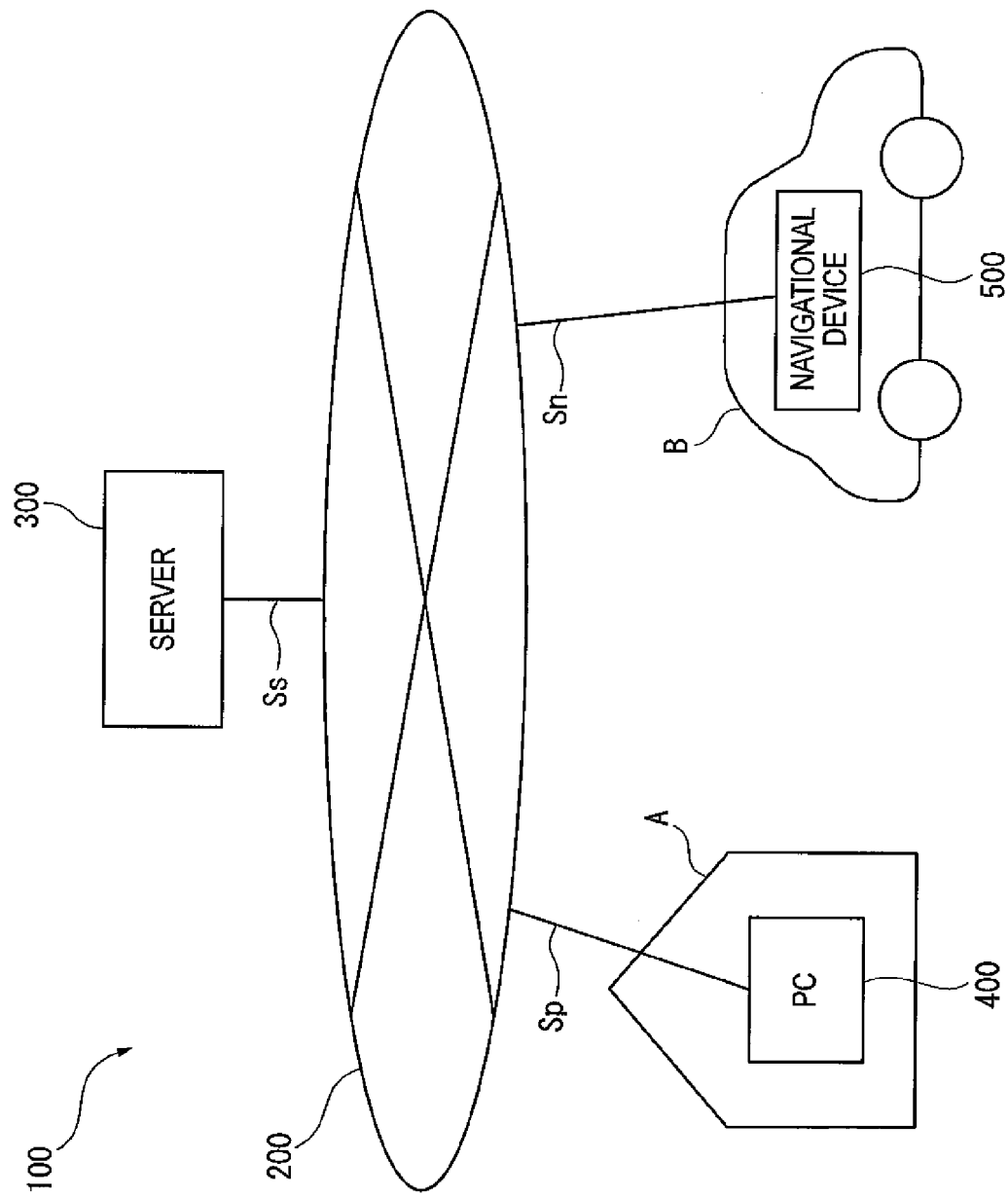
FIG. 1 is a block diagram showing a simplified arrangement of a travel support system according to an embodiment of the invention.
Figure 2:
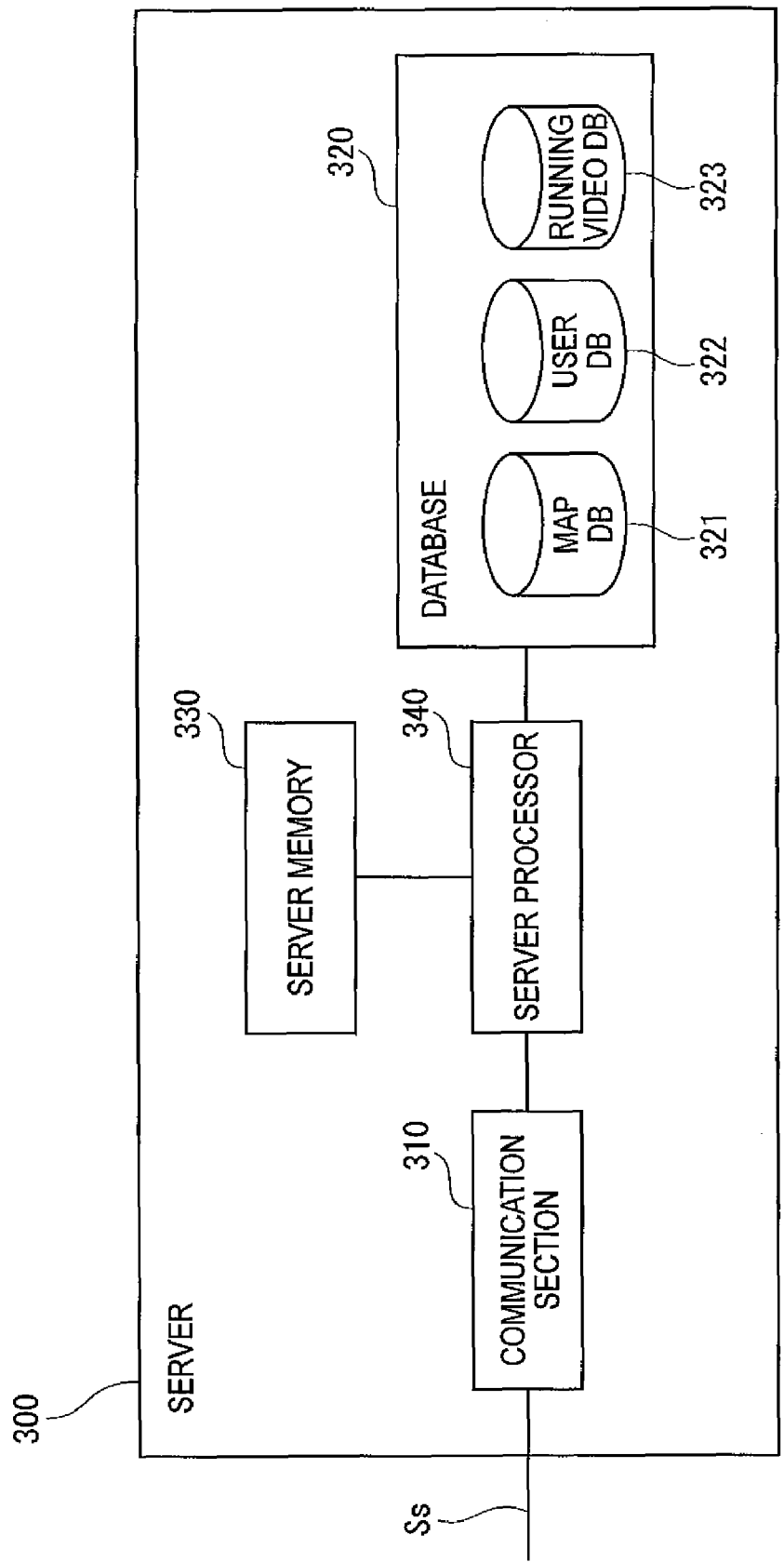
FIG. 2 is a block diagram showing a simplified arrangement of a server according to the embodiment.
Figure 3:
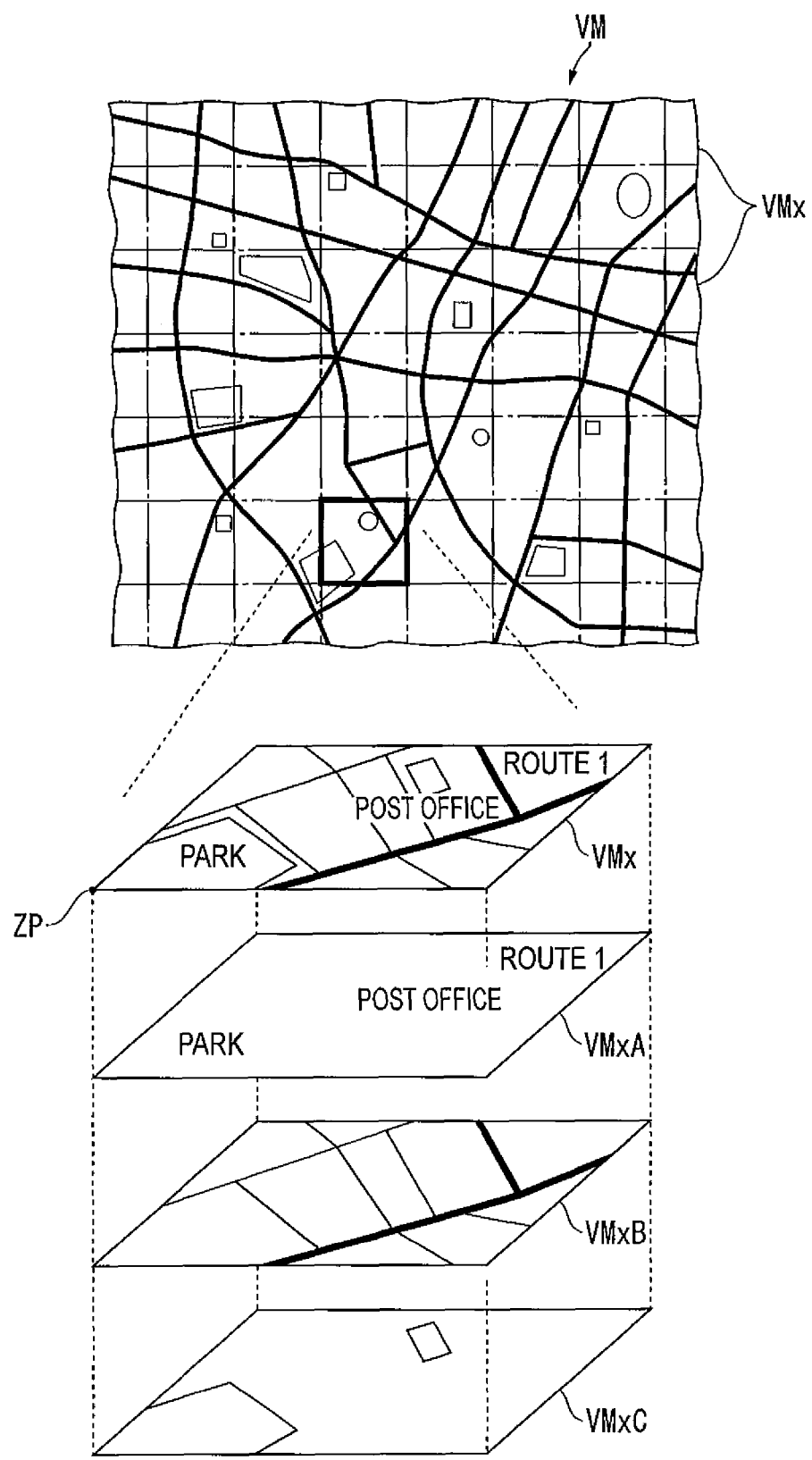
FIG. 3 is a conceptual figure schematically showing a table structure of display data that forms map information in the embodiment.
Figure 4:
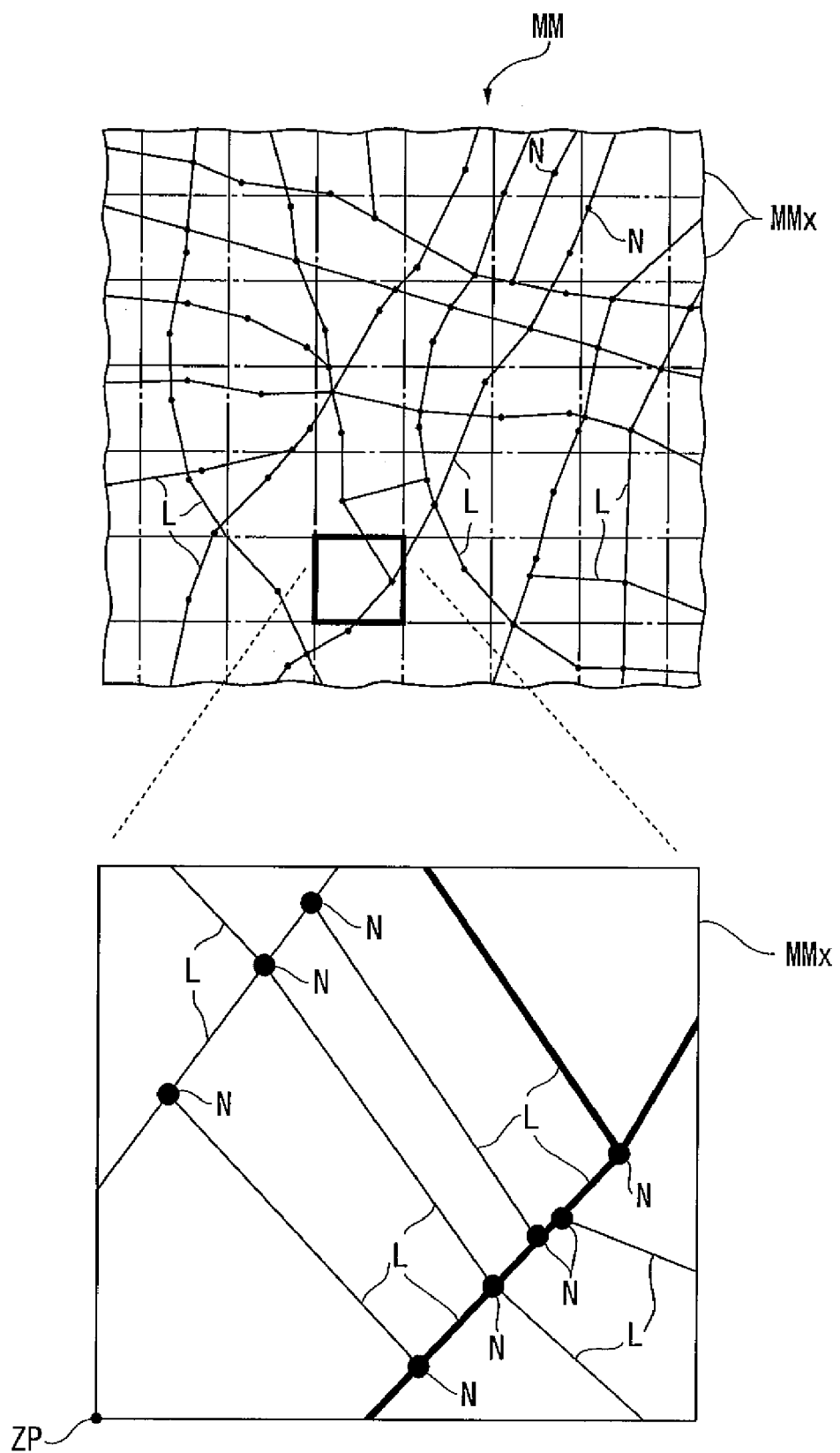
FIG. 4 is a conceptual figure schematically showing a table structure of matching data that forms map information in the embodiment.
Figure 5:
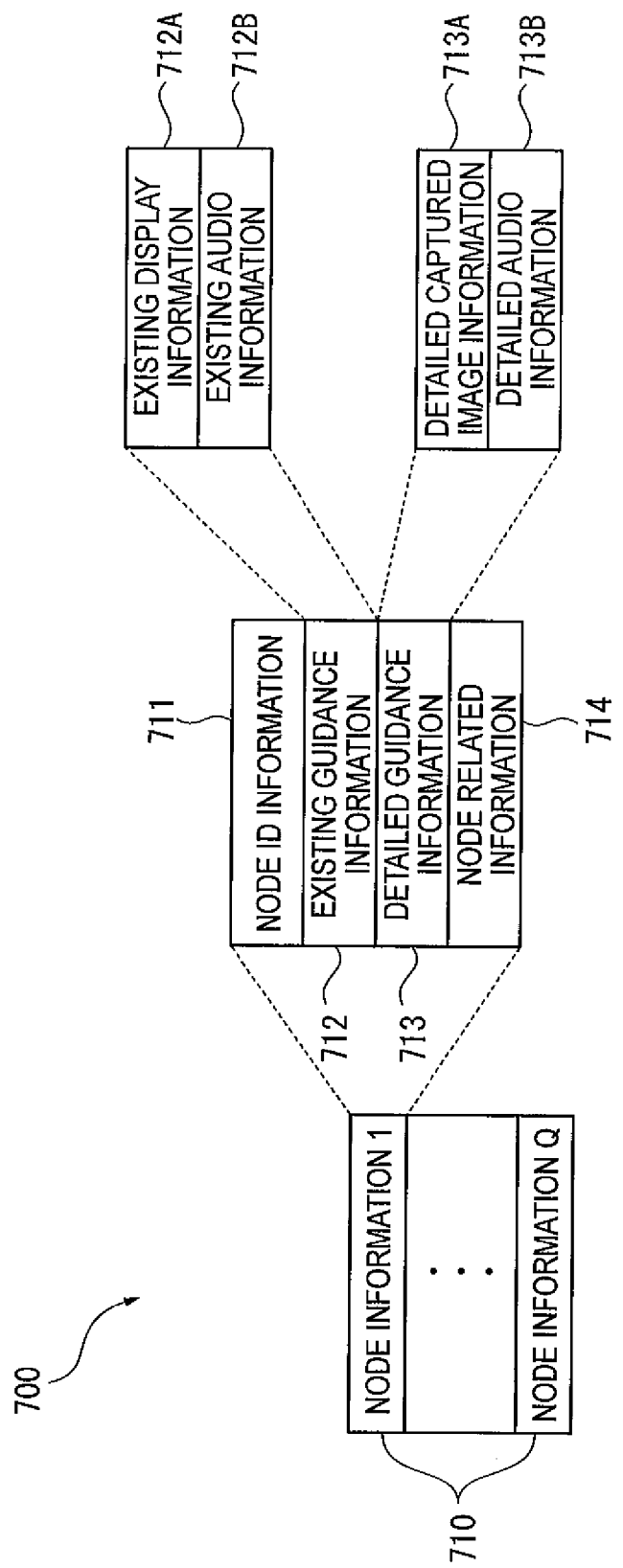
FIG. 5 is a conceptual figure schematically showing a table structure of data in a server node information table in the embodiment.
Figure 6:
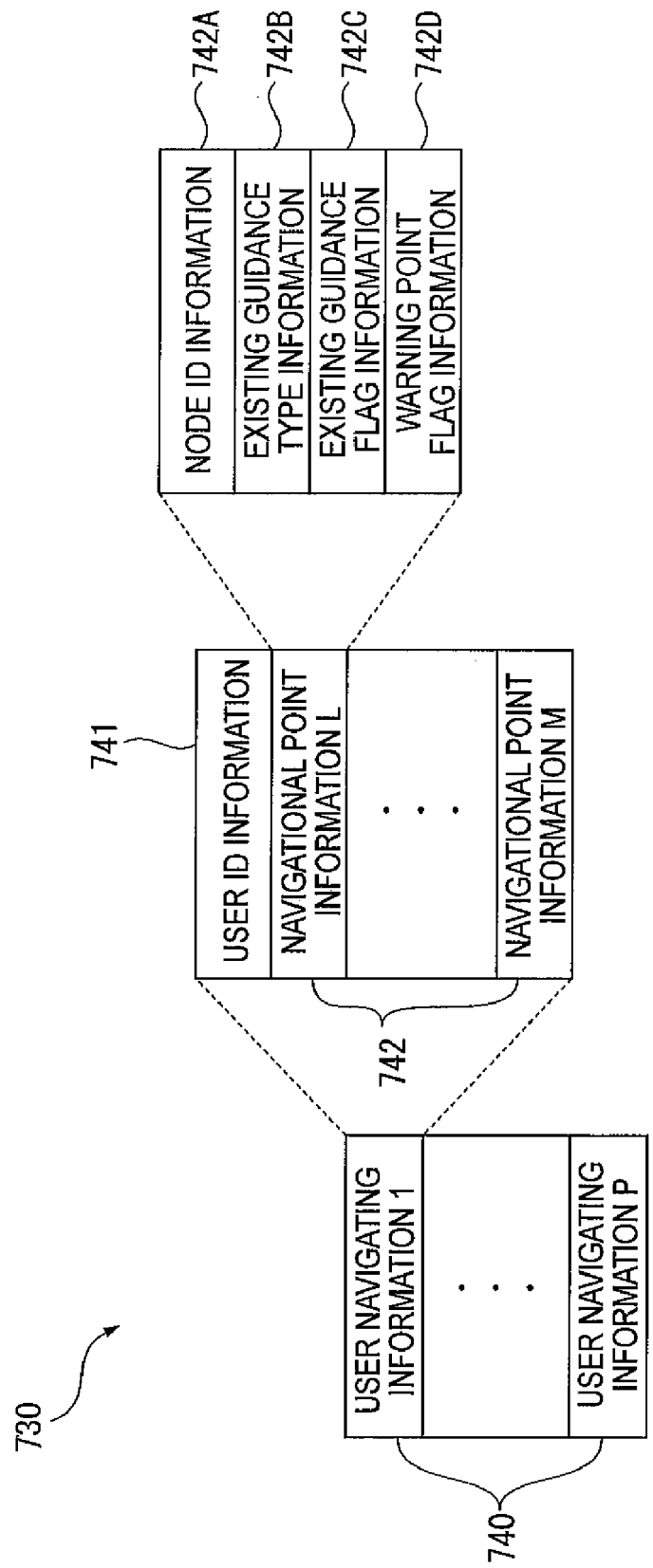
FIG. 6 is a conceptual figure schematically showing a table structure of data in a user navigating information table in the embodiment.
Figure 7:
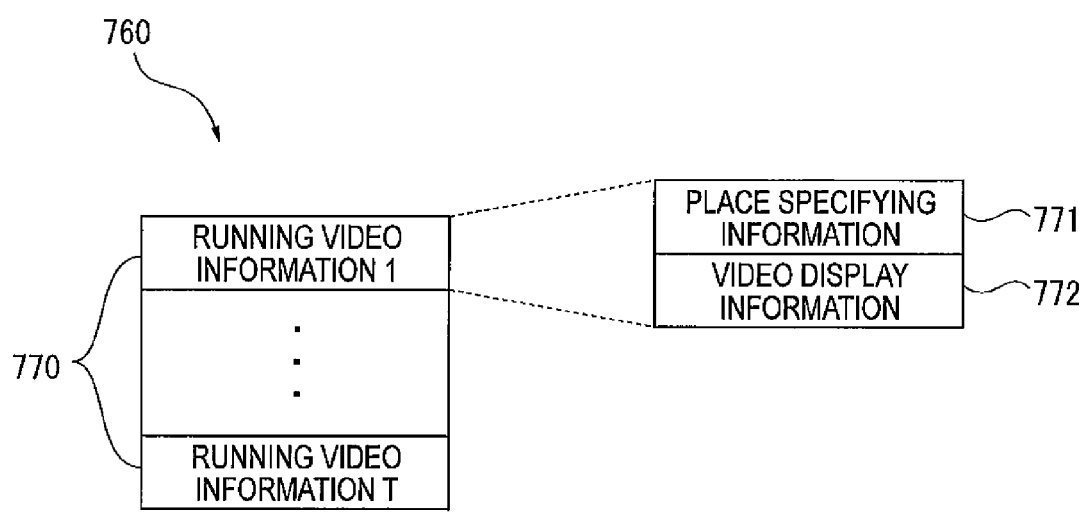
FIG. 7 is a conceptual figure schematically showing a table structure of data in a running video information table in the embodiment.
Figure 8:
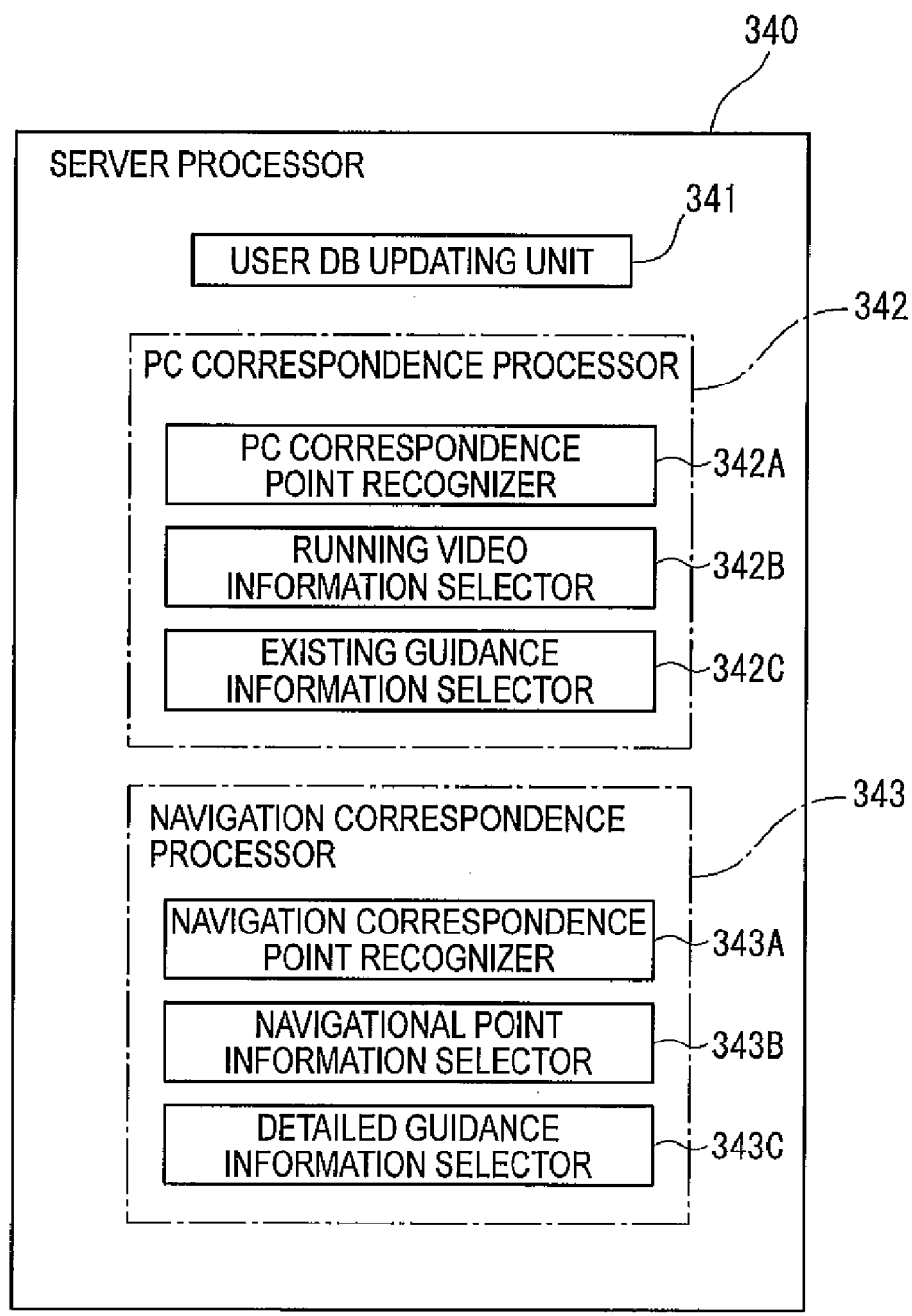
FIG. 8 is a block diagram showing a simplified arrangement of a server processor that forms the server in the embodiment.
Figure 9:
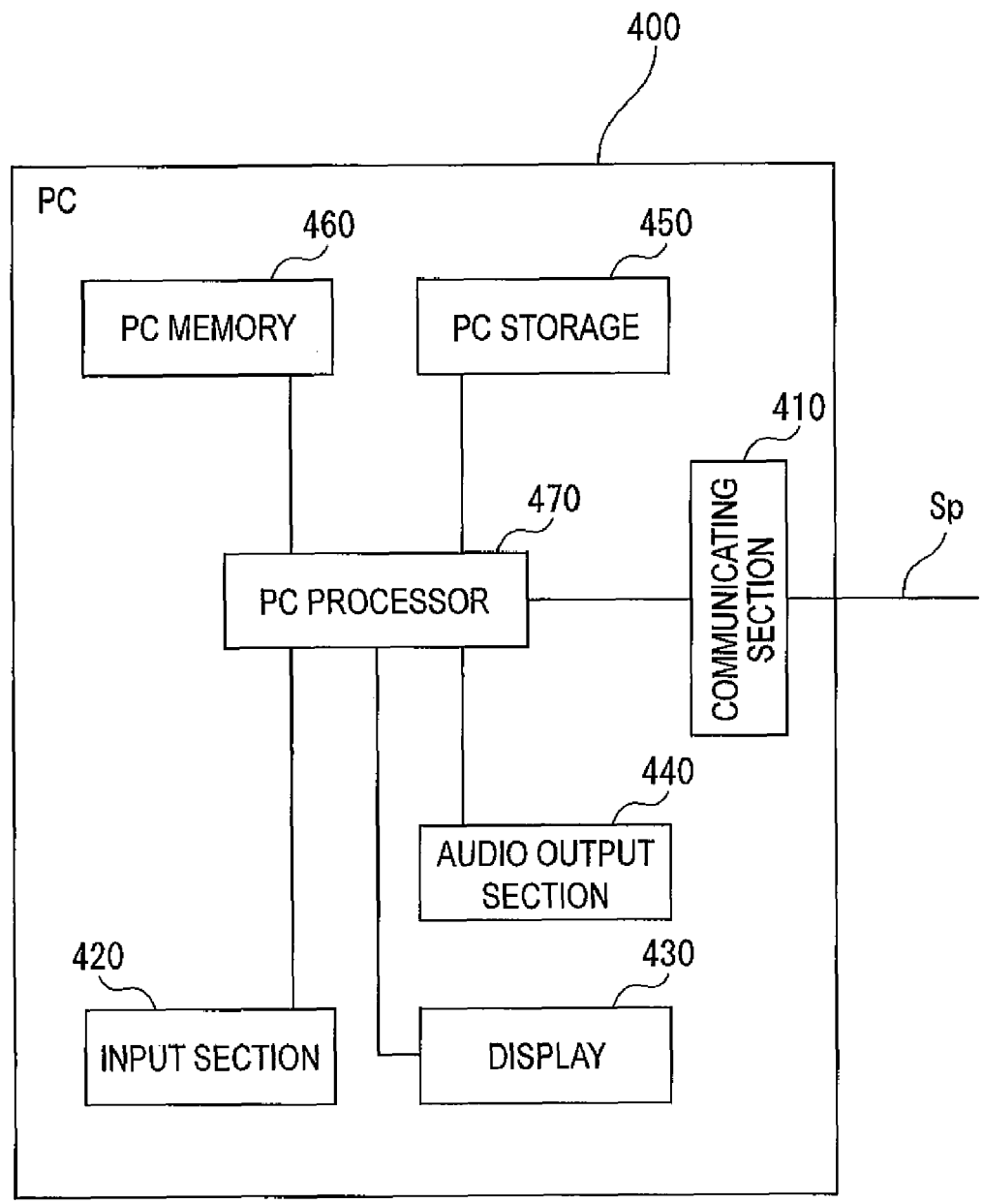
FIG. 9 is a block diagram showing a simplified arrangement of a PC in the embodiment.
Figure 10:
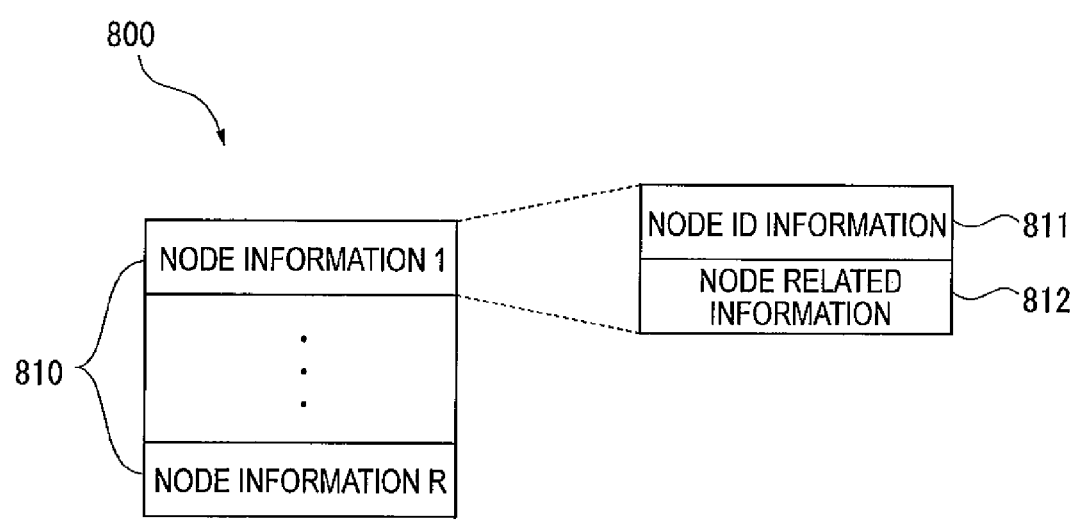
FIG. 10 is a conceptual figure schematically showing a table structure of data in a PC node information table in the embodiment.
Figure 11:
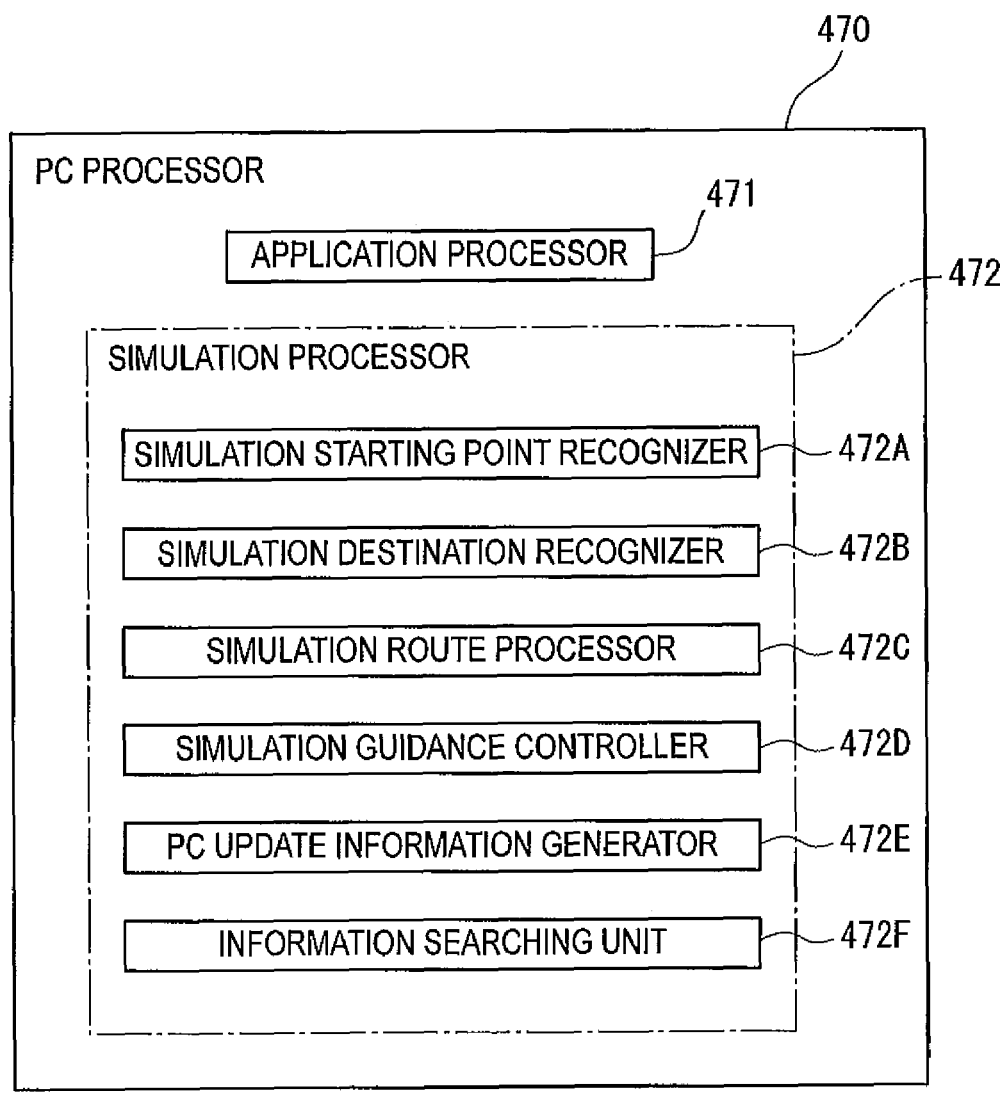
FIG. 11 is a block diagram showing a simplified arrangement of a PC processor that forms the PC in the embodiment.
Figure 12:
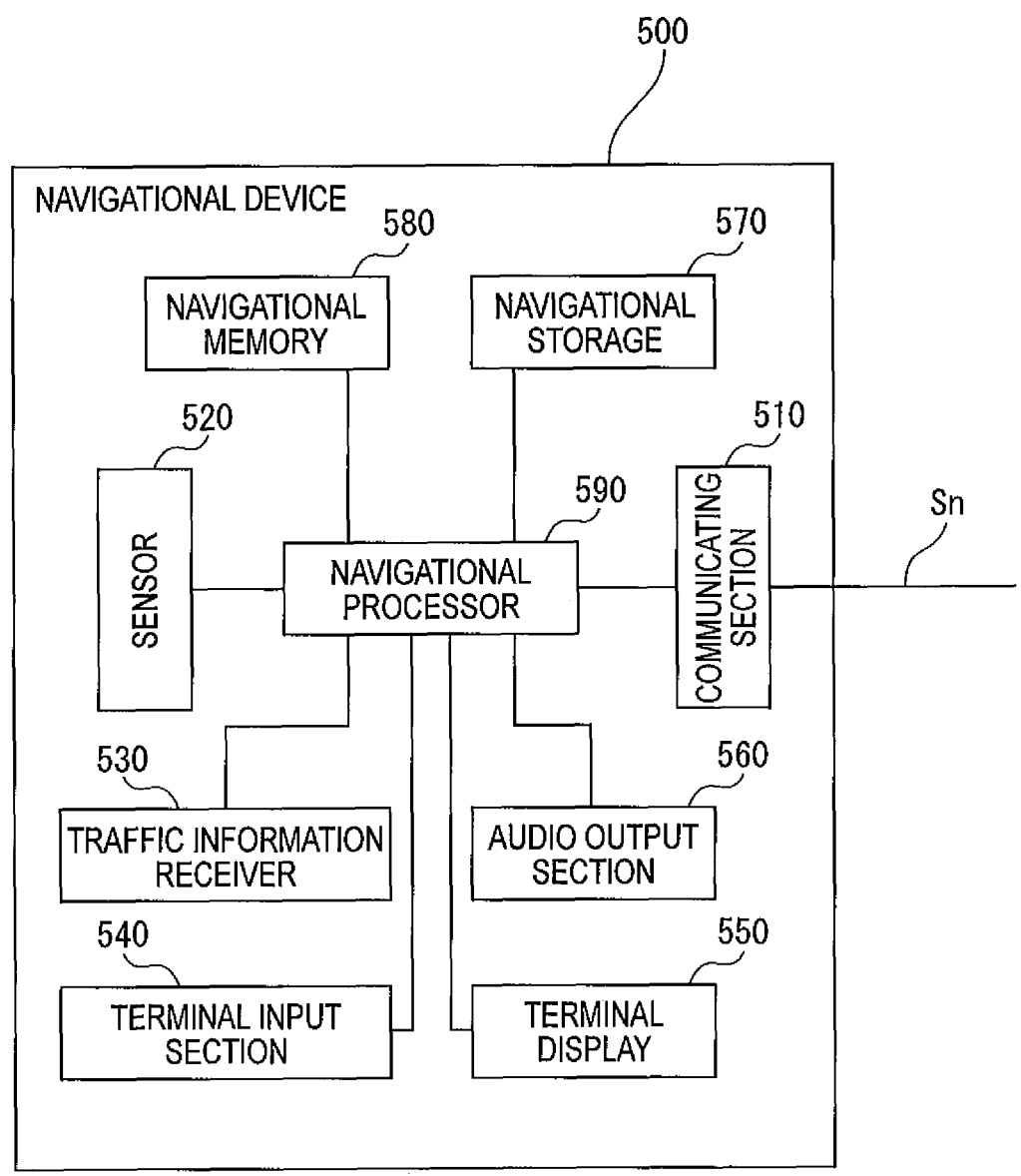
FIG. 12 is a block diagram showing a simplified arrangement of a navigational device in the embodiment.
Figure 13:
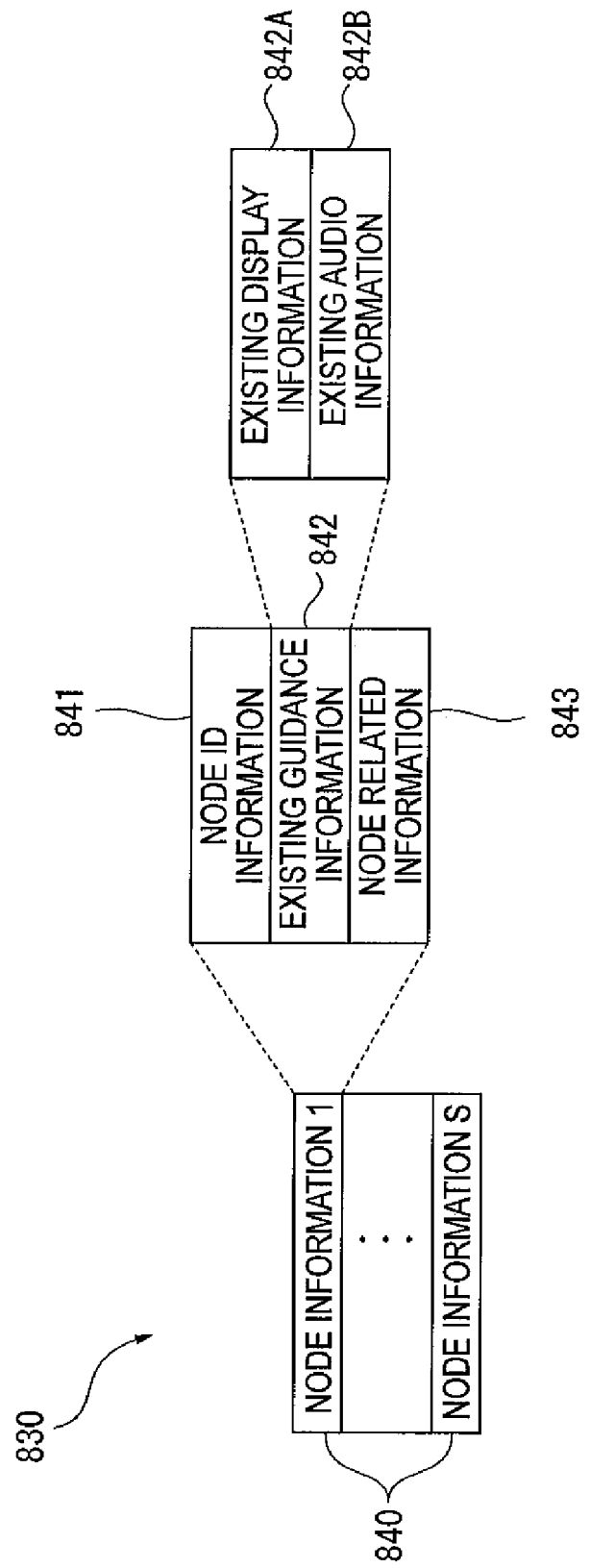
FIG. 13 is a conceptual figure schematically showing a table structure of data in a navigational node information table in the embodiment.
Figure 14:
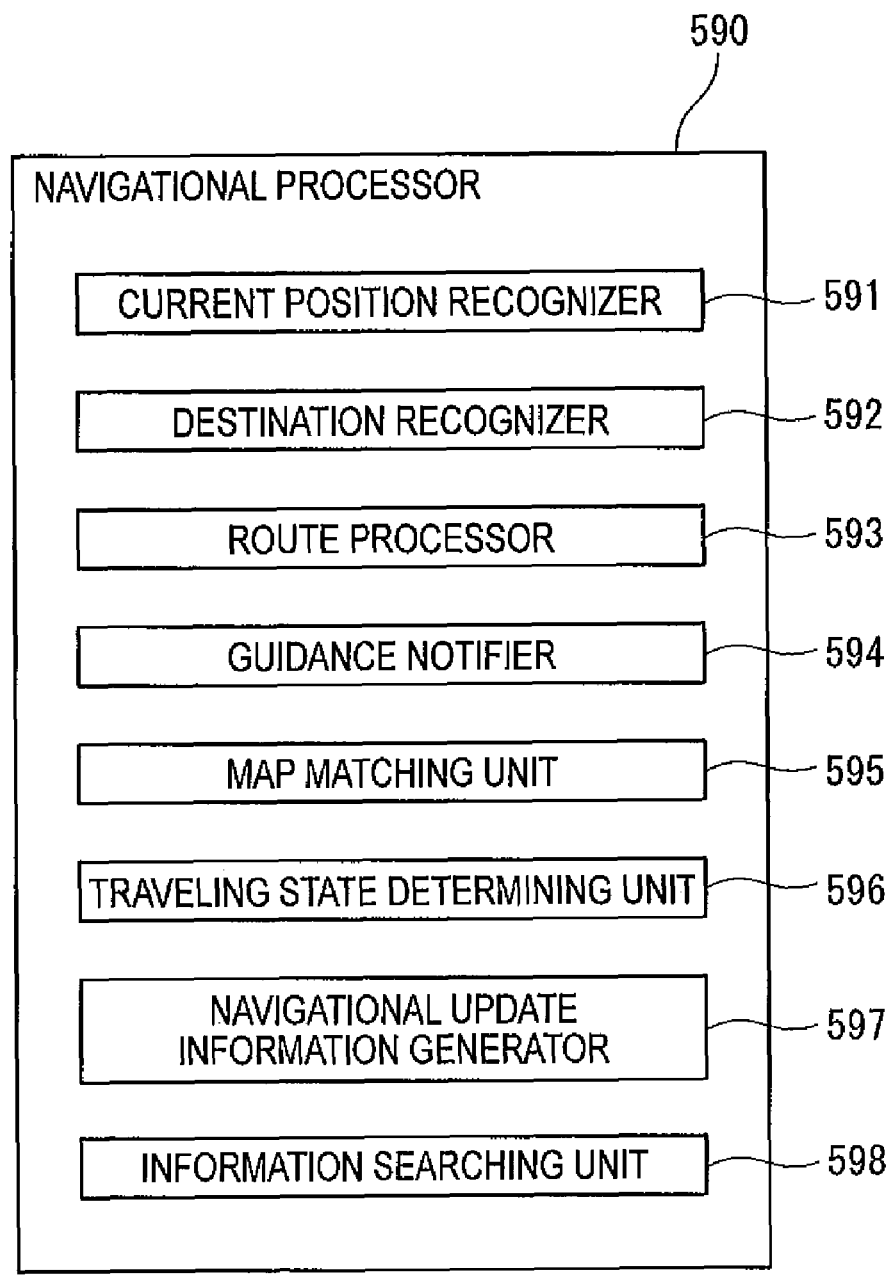
FIG. 14 is a block diagram showing a simplified arrangement of a navigational processor that forms the navigational device in the embodiment.
Figure 15:
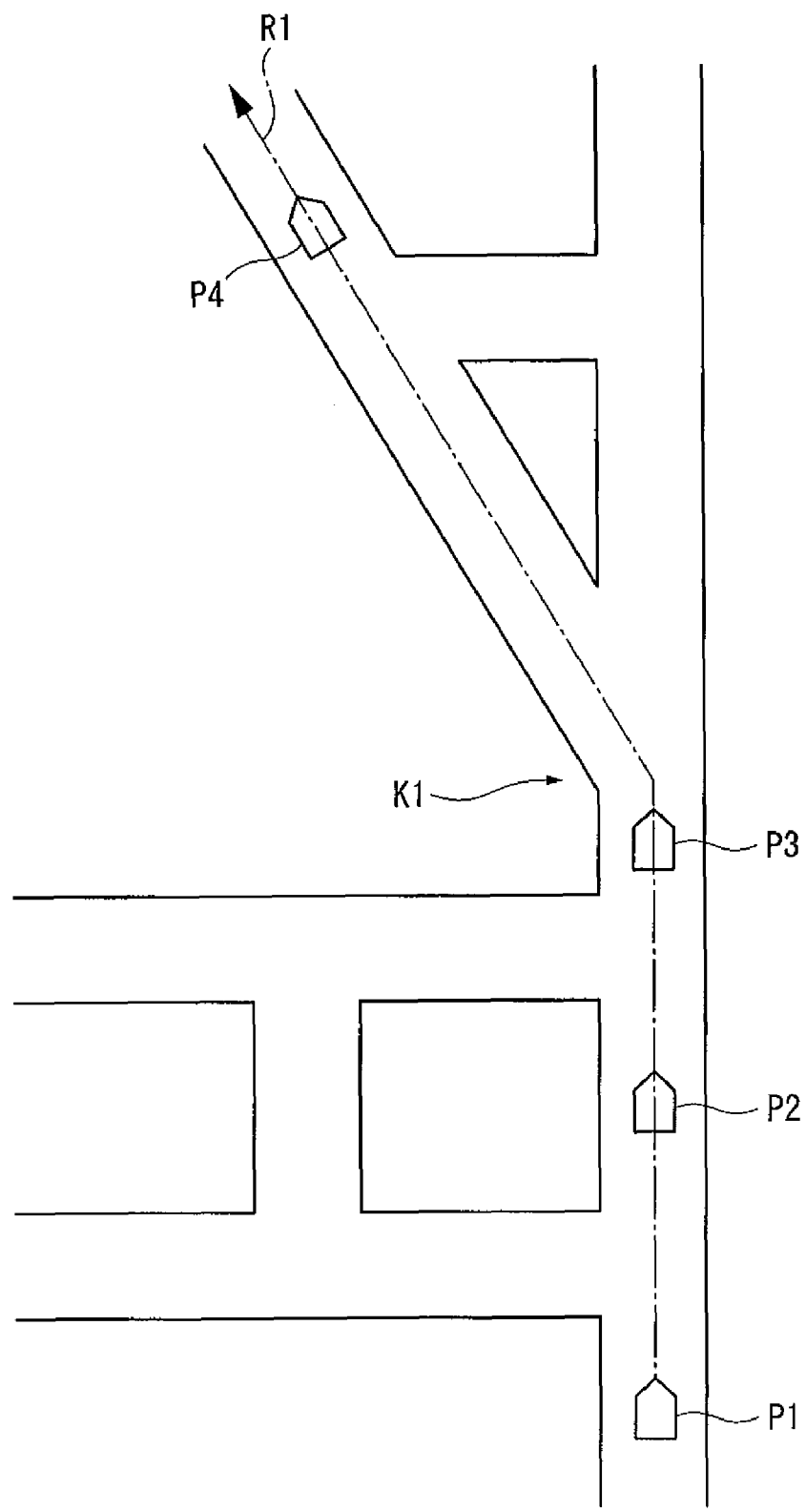
FIG. 15 is a conceptual figure showing a state of a vehicle running along a navigational route in the embodiment.
Figure 16:
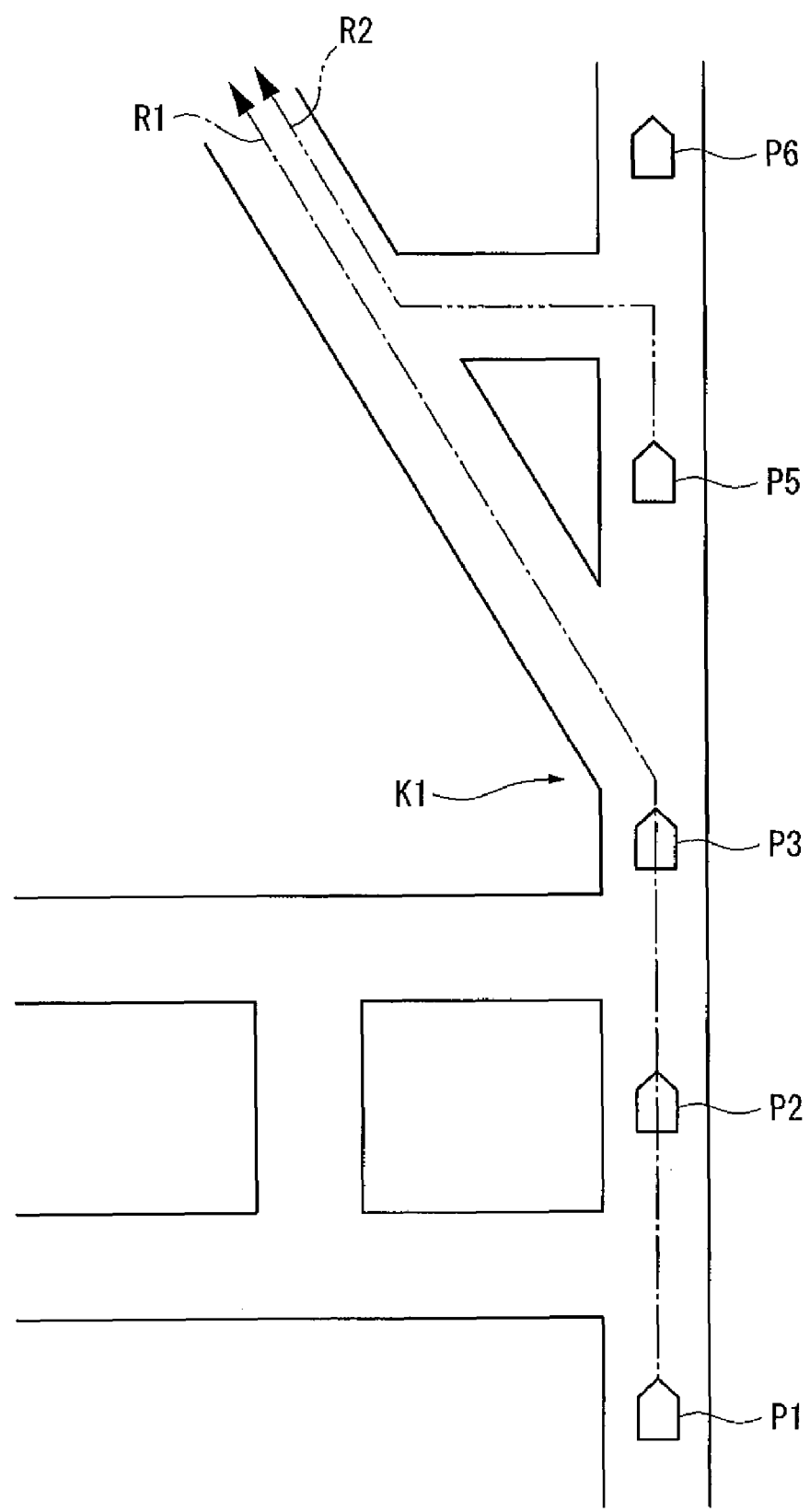
FIG. 16 is a conceptual figure showing a state of a vehicle running in a manner intentionally deviating from a navigational route in the embodiment.
Figure 17:
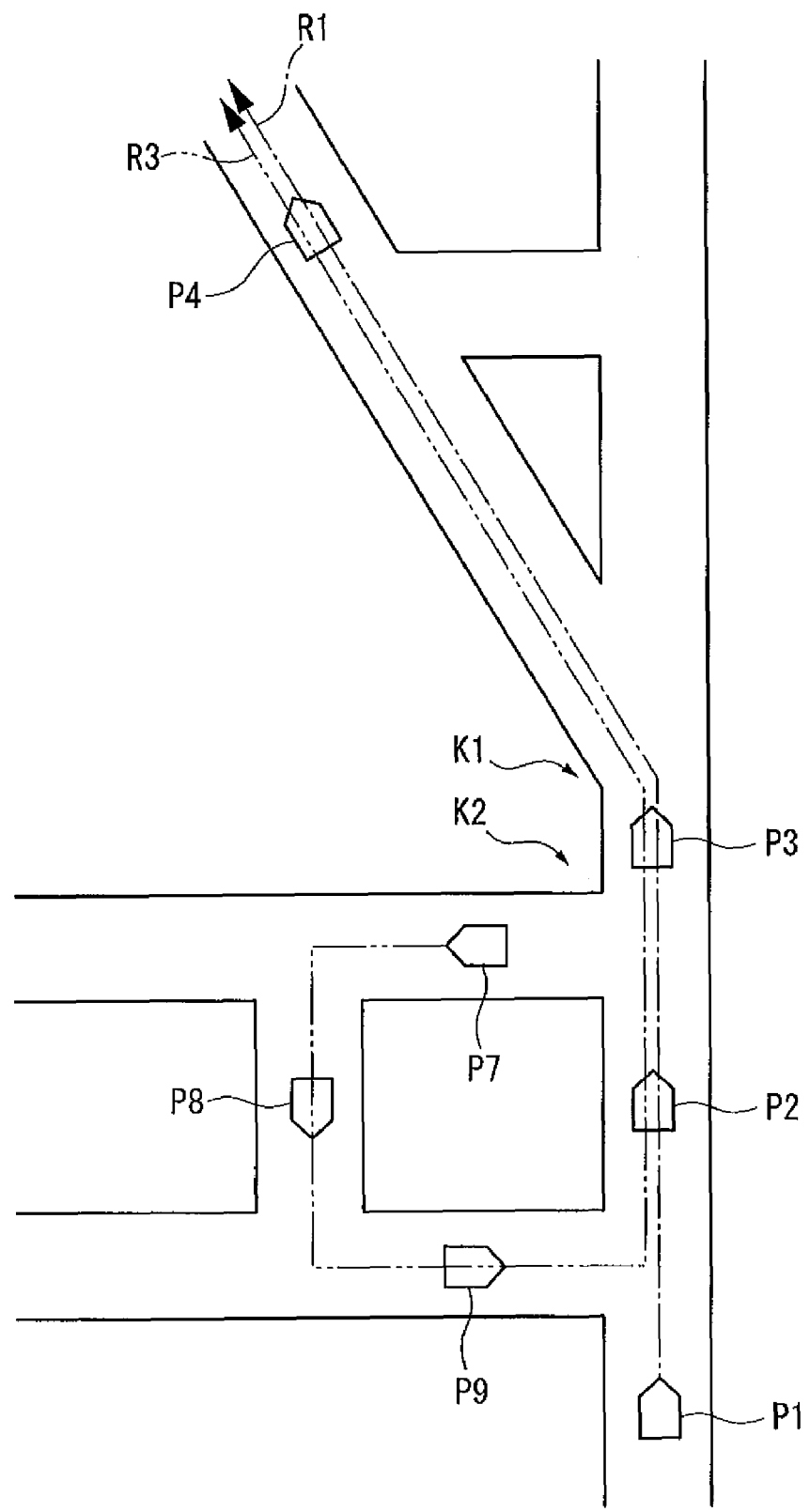
FIG. 17 is a conceptual figure showing a state of a vehicle that deviates from a navigational route by mistake and subsequently returns to and runs along the navigational route in the embodiment.

FIG. 1 is a block diagram showing a simplified arrangement of a travel support system according to the embodiment. FIG. 2 is a block diagram showing a simplified arrangement of a server. FIG. 3 is a conceptual figure schematically showing a table structure of display data that forms map information. FIG. 4 is a conceptual figure schematically showing a table structure of matching data that forms map information. FIG. 5 is a conceptual figure schematically showing a table structure of data in a server node information table. FIG. 6 is a conceptual figure schematically showing a table structure of data in a user navigating information table. FIG. 7 is a conceptual figure schematically showing a table structure of data in running video information table. FIG. 8 is a block diagram showing a simplified arrangement of a server processor that forms the server. FIG. 9 is a block diagram showing a simplified arrangement of a PC. FIG. 10 is a conceptual figure schematically showing a table structure of data in a PC node information table. FIG. 11 is a block diagram showing a simplified arrangement of a PC processor that forms the PC. FIG. 12 is a block diagram showing a simplified arrangement of a navigational device. FIG. 13 is a conceptual figure schematically showing a table structure of data in navigational node information table. FIG. 14 is a block diagram showing a simplified arrangement of a navigational processor that forms a navigational device. FIG. 15 is a conceptual figure showing a state of a vehicle traveling along a navigational route. FIG. 16 is a conceptual figure showing a state of a vehicle running in a manner intentionally deviating from a navigational route. FIG. 17 is a conceptual figure showing a state of a vehicle that deviates from a navigational route by mistake and subsequently returns to and runs along the navigational route.

Arrangement of Travel Support System

In FIG. 1, a travel support system is denoted by 100. The travel support system 100 is a system that notifies guidance concerning travel after reflecting user settings subsequent to route simulation in correspondence with traveling status of a traveling body such as a vehicle B. The traveling body is not limited to the vehicle B, but includes any traveling body such as an aircraft and a ship.

The travel support system 100 includes: a network 200; a server 300; a predetermined place terminal that forms a terminal in the form of a PC (personal computer) 400; and a traveling body terminal that forms a terminal in the form of a navigational device 500.

Arrangement of Network

Firstly, an arrangement of the network 200 will be described.

The server 300, the PC 400, and the navigational device 500 are connected to the network 200. The network 200 connects the server 300, the PC 400, and the navigational device 500 in a manner capable of sending and receiving information. Examples of the network 200 include: the Internet, intranet, and LAN (local area network) based on multipurpose protocol such as TCP (Transmission Control Protocol)/IP (Internet Protocol); a network such as a communication line network and a broadcasting network in which a plurality of base stations capable of sending and receiving contents via wireless media form a network; and wireless media that itself form media for directly sending and receiving contents. Here, any suitable medium such as radio waves, light, sound waves, electromagnetic waves can be applied as the wireless medium.

Arrangement of Server

Next, an arrangement of a server will be described.

The server 300 is capable of sending information to and receiving information from the PC 400 and the navigational device 500 via the network 200. The server 300 can acquire various information from servers (not shown) installed at various entities including government agencies such as the Meteorology Agency and the Police Agency, private corporations, VICS, and business enterprises via the network 200. Examples of the acquired information include information concerning travel of vehicles, or in other words, information that are utilized during travel of vehicles, such as meteorological information, VICS information, and shop information concerning gas stations and food shops As shown in FIG. 2, the server 300 includes a communication section 310, a server storage in the form of a database 320, a server memory 330, and a server processor 340.

The communication section 310 is connected to the PC 400 and the navigational device 500 via the network 200 and is also connected to the server processor 340.

The communication section 310 executes pre-set input interface processing on a server signal Ss which is inputted via the network 200, and outputs the yield as the processing server signal to the server processor 340. If the processing server signal to be sent to the PC 400 or the navigational device 500 from the server processor 340 is inputted to the communication section 310, the communication section 310 executes pre-set output interface processing on the inputted processing server signal, and outputs the yield as the server signal Ss to the PC 400 or the navigational device 500 via the network 200.

The database 320 is a database of a variety of information to send to the PC 400 and the navigational device 500. The database 320 is suitably updated by the server processor 340. For example, the database 320 includes: a drive which readably stores data on a recording medium such as a HD (hard disk), DVD (digital versatile disc), an optical disc, and a memory card; and a driver.

The database 320 includes a map DB (database) 321, a user DB (database) 322, and a running video DB (database) 323.

For example, the map DB 321 readably stores map information as shown in FIGS. 3 and 4 and a server node information table 700 as shown in FIG. 5.

Here, the map information includes display data VM that is so-called POI (point of interest) data as shown in, for example, FIG. 3, and matching data MM as shown in, for example, FIG. 4.

The display data VM includes a plurality of display mesh information VMx which is respectively provided with mesh codes, for example. In other words, the display data VM is divided to a plurality of display mesh information VMx concerning a portion of area and is configured by the plurality of display mesh information VMx in continuously lined lengthwise and crosswise. Each display mesh information VMx is divided to a rectangular shape having a determined length of a side, in other words, having a length to which an actual geographical length is shortened in correspondence with a scale of the map, and is provided at a predetermined corner thereof with an entirety of the map information, or for example, information of absolute coordinate ZP in the global map.

Incidentally, the display mesh information VMx may be further divided to a plurality of lower-level display mesh information VMx concerning a portion of area.

The display mesh information VMx is formed by a name information VMxA such as a name of an intersection, a road information VMxB, and a background information VMxC.

Similarly to the display data VM, the matching data MM is divided to a plurality of matching mesh information MMx concerning a portion of area respectively provided with a unique number, for example, and the matching mesh information MMx is continued lengthwise and crosswise to form the matching data MM. Each matching mesh information MMx is divided to a rectangular shape having a determined length of a side, in other words, having a length to which an actual geographical length is shortened in correspondence with a scale of the map, and is provided at a predetermined corner thereof with an entirety of the map information, or for example, information of absolute coordinate ZP in the global map.

Incidentally, the matching mesh information MMx may be further divided to a plurality of lower-level matching mesh information MMx concerning a portion of area. Regarding the matching mesh information MMx, a data structure representing an area different from the display mesh information VMx, or in other words, an area to be divided, may be different in scale.

The matching data MM is used in a map matching processing as follows. In order to prevent a vehicle from wrongfully displayed to be, for example, not on a road but in a building when the traveling state of a vehicle is displayed in a superposing manner over map information, the matching data MM is used to set the display right so that the vehicle is displayed to be on a road. The matching data MM has a plurality of link column block information.

As shown in FIG. 4, link column block information is a table structure of data in which a plurality of links L that are line segments, forming roads, that connect nodes N as location information are related. The link L has link ID (identification) which is added for each of the links L and node information which is a unique number that represents two nodes connected by one of the link L.

The node N is equivalent to a node of roads such as an intersection, a curve point, a branch point, and a merging point. The node N has a node ID that is a unique number added to each of the nodes N in the link column information.

As shown in FIG. 5, the server node information table 700 is arranged in a table structure on which a plurality of node information 710. The node information 710 is information related to link column block information related to the nodes N.

The node information 710 is arranged in single data where the node ID information 711, the existing guidance information 712, the detailed guidance information 713, and the node related information 714 are related.

The node ID information 711 is unique information that is related to node IDs of nodes N positioned at both ends of a link L to specify each of the node information 710. On the node ID information 711, a node ID, for example, is recorded, and a link L corresponding to the node information 710 is specified by the node ID information 711.

Incidentally, on the node ID information 711, information such as that concerning coordinates of the node N that specifies the node N may be recorded.

The existing guidance information 712 is information concerning guidance of an intersection on which predetermined guidance is set to be notified.

Here, an intersection for which guidance is notified with the existing guidance information 712 will be, while being described, occasionally referred to as a second intersection in the form of an existing guidance point. Guidance based on the existing guidance information 712 will be occasionally referred to as the existing guidance. The existing guidance information 712 includes existing display information 712A and existing audio information 712B.

The existing display information 712A is existing information of an intersection for, for example, displaying an enlarged illustration of an intersection.

The existing audio information 712B is information for audibly outputting an existing guidance of an intersection.

The detailed guidance information 713 is information concerning guidance of an intersection on which a guidance that is more detailed than the guidance based on the existing guidance information 712 is set, by a user, to be notified.

Here, an intersection for which a detailed guidance is notified with the detailed guidance information 713 will be occasionally referred to as a first intersection in the form of a warning point. A guidance based on the detailed guidance information will be occasionally referred to as the detailed guidance. Existing guidance points and warning points are collectively referred as navigational points.

The detailed guidance information 713 includes detailed captured image information 713A that also functions as detailed display information and detailed audio information 713B that functions as detailed arrival information.

The detailed captured image information 713A is for displaying, as a detailed guidance of an intersection, a captured image of a detailed state of the intersection captured by a capturing device.

The detailed audio information 71313 is for audibly outputting a detailed guidance designated to the intersection as a detailed guidance of an intersection.

The node related information 714 is related to a location that corresponds to a node. Specifically, recorded in the node related information 714 are: information that indicates latitude and longitude of the node N with, for example, an X coordinate and an Y coordinate on map information; address information of the node N; information telling whether the node N is an intersection; information of a name of the intersection in the case the node N is an intersection; information concerning right and left turns of the intersection of the node N; information concerning presence of a right-turn lane or a left-turn lane; and information concerning presence of a signal.

Incidentally, in the case the node N represented by the node ID information 711 is not an intersection, the node information 710 may not include the existing guidance information 712 or the detailed guidance information 713.

The user DB 322 readably stores, for example, a user navigating information table 730 as shown in FIG. 6. The user navigating information table 730 is suitably updated by the server processor 340. The user navigating information table 730 is arranged in a table structure in which a plurality of user navigating information 740 are recorded.

The user navigating information 740 is information concerning notifying state of an intersection guidance that is set for each user of the travel support system 100.

The user navigating information 740 is arranged in single data in which user specifying information in the form of user ID information 741 and at least one navigational point information 742, for example, are interrelated A unique ID for a user is recorded in the user ID information 741. The user ID information 741 specifies the user navigating information 740 that corresponds to a predetermined user.

The navigational point information 742 is information concerning a notifying state of an intersection guidance that is set for each user specified by the user ID information 741.

The navigational point information 742 is arranged in single data in which the node ID information 742A, the existing guidance type information 742B, the non-notifying request information in the form of existing guidance flag information 742C and warning point flag information 742D, for example, are interrelated.

In the node ID information 742A, a node ID similar to the node ID information 711 is recorded.

The existing guidance type information 742B is information concerning types of existing guidance to be notified for an intersection specified by the node ID information 742A. Specifically, recorded in the existing guidance type information 742B is information indicating any one of the following statements: a statement telling to perform only illustration display based on the existing display information 712A; a statement telling to perform only an audio output based on the existing audio information 712B; and a statement telling to perform both an illustration display and an audio output.

The existing guidance flag information 742C is flag information that indicates whether notifying of the existing guidance based on the existing guidance type information 742B is performed at an intersection specified by the node ID information 742A. If the notifying of the existing guidance is to be performed, for example, "1" is recorded in the existing guidance flag information 742C, and if the notifying of the existing guidance is not to be performed, "0" is recorded in the existing guidance flag information 742C.

The warning point flag information 742D is flag information that indicates whether notifying of the detailed guidance based on the detailed guidance information 713 is performed at an intersection specified by the node ID information 742A.

If the notifying of the detailed guidance is to be performed, for example, "1" is recorded in the warning point flag information 742D, and if the notifying of the detailed guidance is not to be performed, "0" is recorded in the warning point flag information 742D.

The traveling DB 323 readably stores, for example, a running video information table 760 as shown in FIG. 7. The running video information table 760 is arranged in a table structure in which a plurality of running video information 770 are recorded.

The running video information 770 is information concerning video of a landscape which a user can visually recognize when running along a predetermined route.

The running video information 770 is arranged in single data in which place specifying information 771, and location state information, location motion image information, and location captured image information in the form of motion image display information 772 are interrelated.

The place specifying information 771 is for specifying a place such as a road or an intersection where the video has been captured. Recorded in the place specifying information 771 are, for example, a link ID indicating a road or a node ID indicating an intersection. Incidentally, the place specifying information 771 may include recorded information of an address of a capturing position, a name of a road or an intersection, a latitude, a longitude, and the like.

The motion image display information 772 is for displaying motion images of states of locations such as a road or an intersection captured by a capturing device. Incidentally, the motion image display information 772 may be arranged as a suitable combination of still images and motion images with predetermined time spans.

The server memory 330 readably stores various information received from the PC 400, the navigational device 500, an exterior server or the like. The server memory 330 stores various programs or the like that are run on an OS (operating system) to control operation of the entire server 300 and the entire travel support system 100. It is preferable that the server memory 330 keeps stored data even in the case of, for example, sudden cutoff of power supply caused by power failure. For example, a CMOS (complementary metal-oxide semiconductor) memory may be employed.

Incidentally, the server memory 330 may include: a drive which readably stores data on a recording medium such as a HD (hard disk), DVD (digital versatile disc), an optical disc, and a memory card; and a driver.

The server processor has input and output ports (not shown), a communication port to which the communication section 310 is connected, a database port to which the database 320 is connected, and a memory port to which the server memory 330 is connected. The server processor 340 includes programs stored in the server memory 330 such as a user DB updating unit 341 that also functions as a first server information acquirer and a non-notifying request information generator; a PC correspondence processor 342; and a navigation correspondence processor 343.

The user DB updating unit 341 performs update processing of the user navigating information table 730 based on PC update information sent from the PC 400 or navigation update information sent from the navigational device 500, for example.

The PC update information is generated in the PC 400 based on an input manipulation by a user. The PC update information includes user information in which the user ID is recorded and navigational point editing information.

The navigational point editing information includes: existing navigation setting information that also functions as non-notifying intersection information that tells to set a notifying state of the existing guidance at a predetermined existing guidance point in a predetermined manner; and detailed guidance intersection information, in the form of a warning point setting information, that tells to set a predetermined intersection as a warning point. The existing navigation setting information includes: point specifying information in which the node ID that specifies the existing guidance point is recorded; and existing guidance information in which setting state of the existing guidance is recorded. In the warning point setting information, the node ID that specifies a warnings point is recorded.

Incidentally, if the navigational point editing information is set for a plurality of existing guidance points or warning points, the navigational point editing information includes the set number of existing navigation setting information and warning point setting information. The navigational point editing information may be arranged without the existing navigation setting information or the warning point setting information.

The navigation update information is generated in the navigational device 500 in the case a user deviates, against the user's will, from a set navigational route, or in other words, in the case the user advances in a wrong direction at an intersection by mistake. The navigation update information includes the user information and the warning point setting information, each of which has been mentioned above.

The user DB updating unit 341 searches a user ID information 741 that corresponds to user information of the PC update information after acquiring PC update information from the PC 400. If the navigational point editing information includes existing navigation setting information, the following processing is conducted.

The user DB updating unit 341 searches node ID information 742A that corresponds to point specifying information of the existing navigation setting information from the user navigating information 740 that has the above-mentioned user ID information having been searched. The existing guidance type information 742B or the existing guidance flag information 742C of the navigational point information 742 including node ID information 742A having been searched is subsequently updated by the user DB updating unit 341 to include contents of the existing guidance information. For example, if only displaying illustration is recorded to be performed in the existing guidance information, the existing guidance type information 742B is updated to this content. If it is recorded in the existing guidance information that the existing guidance is not to be performed at all, "0" is recorded in the existing guidance flag information 742C.

If the navigational point editing information includes warning point setting information, the user DB updating unit 341 conducts the following processing.

The user DB updating unit 341 searches node ID information 742A that corresponds to warning point setting information from the user navigating information 740 that has been searched based on the user information. The warning point flag information 742D of the navigational point information 742 having the node ID information 742A having been searched is subsequently updated by the user DB updating unit 341 to include the content of the warning point setting information, that is, "1".

If the user DB updating unit 341 acquires the navigation update information from the navigational device 500, the warning point flag information 742D of the user navigating information 740 that corresponds to the user information is updated to "1" based on the warning point setting information.

The PC correspondence processor 342 suitably selects various information concerning simulated items set by simulation in the PC 400 such as a plurality of traveling routes (hereafter referred to as the "simulation route") or existing guidance points and sends the yield to the PC 400.

The PC correspondence processor 342 includes: a PC correspondence point recognizer 342A that also functions as the second server information acquirer; the location state information selector in the form of a running video information selector 342B; and the existing guidance information selector 342C.

The PC correspondence point recognizer 342A recognizes a link D and a node ID that corresponds to the simulation route.

The simulation route is a route from a starting point of simulant property (hereafter referred to as "simulation starting point") to a destination of simulant property (hereafter referred to as "simulation destination"), set by simulation.

The PC correspondence point recognizer 342A acquires PC point information as location state request information that has the user information, simulation route related information as simulation route related information concerning a plurality of simulation routes from the PC 400 and searches map information including a simulation route of the simulation route related information in the map DB 321. Based on the searched map information, link IDs and node IDs on the simulation route are recognized. The PC correspondence point recognizer 342A outputs link specifying information that specifies the link ID, node specifying information that specifies the node ID, and user information to the running video information selector 342B and outputs the node specifying information and the user information to the existing guidance information selector 342C.

The running video information selector 34213 selects running video information 770 that corresponds to each of the simulation routes and the send the yield to the PC 400.

Specifically, if the running video information selector 3423 acquires link specifying information and node specifying information from the PC correspondence point recognizer 342A, the running video information selector 342B searches place specifying information 771 that corresponds to these. The running video information selector 342B selects running video information 770 that has the searched place specifying information 771 and sends the yield to a PC 400 specified by the user information.

The motion image display information 772 of the running video information 770, which has been sent, includes motion images of roads and intersections where the user runs when running along the simulation route. By visually recognizing the motion image of the motion image display information 772, the user can simulate the predetermined route without getting in the vehicle B.

The existing guidance information selector 342C selects existing guidance information 712 that corresponds to each of the simulation routes and the sends the yield to the PC 400.

Specifically, if the existing guidance information selector 342C acquires node specifying information from the PC correspondence point recognizer 342A, the existing guidance information selector 342C searches an existing guidance point. In other words, if the existing guidance information selector 342C finds existing guidance information in the node information 710 that has the node ID information 711 by searching for the node ID information that corresponds to the node specifying information, the existing guidance information selector 342C recognizes a node N of the node ID to be the existing guidance point. Then the existing guidance information selector 342C selects the node ID information 711 and the existing guidance information 712 and sends the yield to the PC 400 specified by the user information. In contrast, if the node information 710 does not include the existing guidance information 712, the existing guidance information selector 342C recognizes the node N of the node ID not to be the existing guidance point, so that the existing guidance information selector 342C does not select existing guidance information 712.

The navigation correspondence processor 343 suitably selects, for example, various information concerning guidance notifying for existing guidance points or warning points on a plurality of traveling routes set in the navigational device 500 aid sends the yield to the navigational device 500.

The navigation correspondence processor 343 includes: a navigation correspondence point recognizer 343A; a navigational point information selector 343B that also functions as a non-notifying request information selector; and a detailed guidance information selector 343C.

The navigation correspondence point recognizer 343A acquires navigational point information having user information and traveling route related information concerning a plurality of simulation routes from the navigational device 500 and searches map information including the traveling route in the traveling route related information. Based on the map information, the navigation correspondence point recognizer 343A recognizes a node ID on the traveling routes based on the map information and outputs node specifying information and user information to the guidance point information selector 343B.

The guidance point information selector 343B selects navigational point information 742 that corresponds to each of the traveling routes.

Specifically, when the navigational point information selector 343B acquires node specifying information and user information from the navigation correspondence point recognizer 343A, the navigational point information selector 343B searches user navigating information 740 that corresponds to the user navigational information. The navigational point information selector 343B searches node ID information 742A that corresponds to the node specifying information in the user navigating information 740 and selects navigational point information 742 having the node ID information 742A. The navigational point information selector 343B sends the navigational point information 742 to the navigational device 500 specified by the user information.

The detailed guidance information selector 343C selects detailed guidance information 713 of a warning point.

Specifically, the detailed guidance information selector 343C determines whether "1" is recorded in warning point flag information 742D of the navigational point information 742 selected in the navigational point information selector 343B, in other words, whether the intersection that corresponds to the navigational point information 742 has been set as a warning point. If the detailed guidance information selector 343C determines that the intersection is set as the warning point, the detailed guidance information selector 343C searches node ID information that corresponds to the node ID information 742A related to the warning point flag information 742D. The detailed guidance information selector 343C selects the detailed guidance information 713 related to the node ID information 711 and sends the yield to the navigational device 500 specified by the user information. In contrast, if the detailed guidance information selector 343C determines that the intersection is not set as the warning point, the detailed guidance information selector 343C does not select the detailed guidance information 713.

Arrangement of PC

Next, an arrangement of the PC 400 will be described.

As shown in FIG. 1, the PC 400 has an arrangement capable of being disposed at a predetermined location such as home A to be used. The PC 400 performs a route simulation and sends information concerning user settings to the server 300.

As shown in FIG. 9, the PC 400 includes the communicating section 410, an input section 420, a location state display unit in the form of a display 430, an audio output section 440, a PC storage 450, a PC memory 460, and a PC processor 470.

The communicating section 410 is connected to the server 300 via the network 200 and also is connected to the PC processor 470.

The communicating section 410 executes pre-set input interface processing on a PC signal Sp which is inputted via the network 200, and outputs the yield as the processing PC signal to the PC processor 470. If the processing PC signal to be sent to the server 300 from the PC processor 470 is inputted to the communicating section 410, the communicating section 410 executes pre-set output interface processing on the inputted processing PC signal, and outputs the yield as the PC signal Sp to the server 300 via the network 200.

Examples of the input section 420 include a keyboard and a mouse, which are provided with a variety of manipulation buttons and manipulation tabs (not shown) for inputting manipulation. What particularly is conducted in the input manipulation with the manipulation buttons and the manipulation tabs are left for, for example, operation settings or the like of the PC 400.

The input section 420 conducts settings by suitably outputting predetermined signals to the PC processor 470 via the manipulation of inputting the settling items. An inputting arrangement applied to the input section 420 is not limited to the input manipulation with the manipulation buttons, manipulation tabs, and the like, but may be any suitable arrangement capable of inputting and setting a variety of setting items. For example, an input manipulation via touch panel provided on the display 430 or an audio input manipulation may be employed.

The display 430 is controlled by the PC processor 470 and displays image data signals from the PC processor 470 on a screen. Other than image data of, for example, map information, search information, and simulation routes, the image data includes: TV image data received by a TV receiver (not shown); image data recorded by an external device on a recording medium such as an optical disc, a magnetic disc, and a memory card and read out by a drive or a driver; and image data from the PC memory 460.

Examples of the display 430 include a liquid display panel, an organic EL (electroluminescence) panel, a PDP (plasma display panel), a CRT (cathode-ray tube), an FED (field emission display), and an electrophoretic display panel.

The audio output section 440 has a sound-producing unit such as a speaker (not shown). The audio output section 440 is controlled by the PC processor 470 and audibly outputs signals such as audio data from the PC processor 470 by the sound-producing unit. Incidentally, the sound-producing unit can suitably output the TV audio data received by the TV receiver, audio data recorded on the recording medium or the PC memory 460, or the like.

The PC storage 450 has an arrangement similar to that of the database 320 of the server 300. For example, the PC storage 450 readably stores map information as shown in FIGS. 3 and 4 and a PC node information table 800 as shown in FIG. 10.

The map information includes: the display data VM as shown in FIG. 3; the matching data MM as shown in FIG. 4; and traveling route detecting map data (not shown).

The traveling route detecting map information is formed, for example, in a table structure similar to the matching data MM. In other words, the traveling route detecting map information assumes a table structure, which is exemplified by a node N that represents a road, has location information that represents location such as a node N that represents a road and line segment information such as a link L that connects locations. Thus, the traveling route detecting map information is an information structure that represents roads for detecting traveling routes.

The PC node information table 800 is arranged in a table structure in which a plurality of node information 810 are recorded. The node information 810 is arranged in single data in which, for example, the node ID information 811 and the node related information 812 are related. In the node ID information 811 and the node related information 812, information similar to the node ID information 711 and the node related information 714 of the server node information table 700 are recorded.

In the PC storage 450, for example, search information for acquiring information of a predetermined location in the map information is stored. Specifically, the search information includes: information of explanation or guide on areas into which a display of the map information is divided, such as local administrative units (e.g., prefectures, cities, and districts) and locations; and information concerning shops that are locations. Such search information forms, for example, a tree-structured table structure where item information is interrelated in a layered manner.

The PC memory 460 readably stores setting items that are inputted via manipulation at the input section 420. The PC memory 460 stores programs that run on an OS to control operations of the entire PC 400. An example of the PC memory 460 is an arrangement similar to the server memory 330.

The PC processor 470 includes; input and output ports (not shown); a key input port to which the input section 420 is connected; a display control port to which the display 430 is connected; an audio control port to which the audio output section 440 is connected; a storage port to which the PC storage 450 is connected and a memory port to which the PC memory 460 is connected. As shown in FIG. 11, the PC processor 470 includes programs such as an application processor 471 and a simulation processor 472.

The application processor 471 suitably conducts processing based on, for example, application software such as word-processing software or spreadsheet software stored in the PC storage 450.

The simulation processor 472 conducts route simulation processing. The simulation processor 472 includes: a simulation starting point information acquirer in the form of a simulation starting point recognizer 472A; a simulation destination information acquirer in the form of a simulation destination recognizer 472B; a simulation route processor 472C that also functions as a simulation route related information acquirer; a location state information acquirer and a location state information display controller in the form of a simulation guidance controller 472D; a detailed guidance intersection information generator and a non-notifying intersection information generator in the form of a PC update information generator 472E; and an information searching unit 472F.

The simulation starting point recognizer 472A acquires, for example, simulation starting point information concerning a simulation starting point inputted and set via input manipulation at the input section 420 and recognizes a position of the simulation stating point. The simulation starting point information inputted and set may include information for specifying a position. For example, coordinates such as latitude and longitude, addresses, and phone numbers may be used. The simulation starting point information concerning the simulation starting point is suitably stored in the PC memory 460.

The simulation destination recognizer 472B, similarly to the simulation starting point recognizer 472A, acquires simulation destination information concerning a simulation destination inputted and set via input manipulation at the input section 420 and recognizes a position of the simulation destination. The simulation destination information concerning the simulation destination is suitably stored in the PC memory 460.

The simulation route processor 472C calculates and route-detects a simulation route from the simulation starting point to the destination based on setting information for setting a simulation route inputted and set by a user and map information stored in the PC storage 450.

Specifically, the simulation route processor 472C acquires simulation starting point information, simulation destination information, and settings information. Further, based on the acquired information, the simulation route processor 472C utilizes the traveling route detecting map information of the map information to detect, for example, a road through which a vehicle can travel and generates and acquires simulation route related information in which a plurality of simulation routes such as a route with a short traveling time, a route with a short traveling distance, and a route evading traffic control are set. The simulation route processor 472C generates PC point information having the simulation route related information and user information generated based on input manipulation at the input section 420 and sends the yield to the server 300.

The simulation route related information is suitably stored in the PC memory 460.

Based on information sent from the server 300 in correspondence with the PC point information, the simulation guidance controller 472D controls the display 430 to display video of the route simulation and the audio output section 440 to output sounds.

Specifically, if the simulation guidance controller 472D acquires the running video information 770, the node ID information 711, and the existing guidance information inter-related with the node ID information 711 the simulation guidance controller 472D makes, for example, the PC memory 460 to store the acquired information. Furthermore, the simulation guidance controller 472D makes, for example, the display 430 to display a simulation screen including: a map area where a map based on map information is displayed; a running video area where running video based on the video information 770 is displayed, and an existing guidance area where an existing guidance based on the existing guidance information 712. Incidentally, the simulation screen may only have, for example, the map area, and the running video area and the existing guidance area may be suitably superimposed on the map area.

In addition to displaying of the map based on the map information on the map area, the simulation guidance controller 472D controls displaying of icons or figures that represent the simulation starting point, the simulation destination, and the simulation route based on the simulation starting point information, the simulation destination information, and the simulation route related information. Furthermore, while a simulation vehicle icon representing the vehicle B is displayed in a manner superimposed on the simulation stating point and moved along the simulation route, the simulation guidance controller 472D recognizes a node ID of the node N corresponding to the vehicle icon and a link ID of the link L.

If the simulation guidance controller 472D recognizes the node ID that corresponds to the place specifying information 771 of the running video information 770, the simulation guidance controller 472D controls displaying of a motion image on the running video display area based on the motion image display information 772 of the running video information 770.

If the simulation guidance controller 472D recognizes a node ID that corresponds to the node ID information 711, the simulation guidance controller 472D controls displaying of illustration of existing guidance in the existing guidance area based on the existing display information 712A of the existing guidance information 712 related to the node ID information 711. The simulation guidance controller 472D outputs sounds of the existing guidance from the audio output section 440 based on the existing audio information 712B of the existing guidance information 712.

Furthermore, if the simulation guidance controller 472D recognizes that the vehicle icon is to be moved to a predetermined position on the simulation route based on the input manipulation at the input section 420, the simulation guidance controller 472D controls the displayed vehicle icon to be moved to the position. If the simulation guidance controller 472D has acquired the motion image display information 772 or the existing guidance information 712 that corresponds to the position to which the vehicle icon is moved, the simulation guidance controller 472D controls outputting of the running video or the existing guidance.

In other words, in the route simulation controlled by the simulation guidance controller 472D, the running video of the simulation route and display and sounds of the existing guidance are outputted.

The PC update information generator 472E generates PC update information used for updating process of the above-mentioned user DB 322.

Specifically, if the PC update information generator 472E recognizes that a notifying state of the existing guidance at the predetermined existing guidance point is to be set at a predetermined state based on the input manipulation at the input section 420 during the route simulation or after the route simulation, the PC update information generator 472E generates existing navigation setting information. In other words, the existing navigation setting information is generated, which includes: existing guidance information that tells to set the existing guidance to be conducted by either displaying or making sounds or not to be conducted by either of the two; and point specifying information in which the node ID of the existing guidance point is recorded.

If the PC update information generator 472E recognizes that a predetermined intersection is to be set as the warning point based on the input manipulation at the input section 420, the PC update information generator 472E generates warning point setting information in which the node ID of the intersection is recorded.

The PC update information generator 472E generates navigational point editing information having the generated existing navigation setting information and warning point setting information. Furthermore, the PC update information generator 472E generates PC update information having the navigational point editing information and user information and sends the PC update information to the server 300.

Based on, for example, search request of search information inputted and set at the input section 420, the information searching unit 472F conducts searching based on search information that is, for example, information of a predetermined location on the map information stored in the PC storage 450. Subsequently, the information searching unit 472F acquires information that corresponds to the search request. The PC memory 460 suitably stores the acquired information of the search result.

Arrangement of Navigational Device

Next, an arrangement of the navigational device 500 will be described.

As shown in FIG. 1, the navigational device 500 is disposed in, for example, the vehicle B. The navigational device 500 notifies the guidance concerning the traveling of the vehicle B based on information sent from a server.

As shown in FIG. 12, the navigational device 500 includes: a communicating section 510; a sensor 520; a traffic information receiver 530; a terminal input section 540; a terminal display 550 that is a terminal display unit forming the terminal notifier; an audio output section 560 that is a terminal audio output unit that forms the terminal notifier; a navigational storage 570; a navigational memory 580; and a navigational processor 590.

The communicating section 510 is connected to the server 300 via the network 200 and also to the navigational processor 590.

The communicating section 510 executes pre-set input interface processing on a navigational signal Sn which is inputted via the network 200, and outputs the yield as the processing navigational signal to the navigational processor 590. If the processing navigational signal to be sent to the server 300 from the navigational processor 590 is inputted to the communicating section 510, the communicating section 510 executes pre-set output interface processing on the inputted processing navigational signal, and outputs the yield as the navigational signal Sn to the server 300 via the network 200.

The sensor 520 detects a traveling state of the vehicle B including the current position and running status and outputs the yield as predetermined signals to the navigational processor 590.

For example, the sensor 520 includes: a GPS (global positioning system) receiving section (not shown); a speed sensor; an azimuth sensor; and an acceleration sensor.

The GPS receiving section receives navigational radio waves outputted from a GPS satellite (not shown) that is an artificial satellite by a GPS antenna (not shown). The GPS receiving section calculates virtual coordinates of the current position based on the signals that correspond to the received navigation radio waves and outputs the yield as the GPS data to the navigational processor 590.

The speed sensor detects a running speed of a vehicle based on the signals that vary in correspondence with the running speed of the vehicle and outputs the yield as the speed data to the navigational processor 590.

The azimuth sensor, which has a so-called gyro sensor (not shown), detects an azimuth of the vehicle, that is, a running direction in which the vehicle advances, and outputs the yield as the azimuth data to the navigational processor 590.

The acceleration sensor detects acceleration in the running direction of the vehicle and outputs the yield as the acceleration data to the navigational processor 590.

The traffic information receiver 530 receives traffic information concerning a traffic state of roads, such as traffic congestion and traffic control.

An example of the traffic information receiver 530 includes a VICS (Vehicle Information Communication System) receiving device, which has been developed and utilized in Japan. The traffic information receiver 530, which utilizes the VICS receiving device, has a VICS antenna (not shown) and acquires information (hereafter referred to as the VICS information) concerning the traffic by the VICS antenna. The traffic information receiver 530 outputs the acquired VICS information to the navigational processor 590.

The terminal input section 540 has, for example, an arrangement similar to the input section 420 of the PC 400. The terminal input section 540 suitably outputs predetermined signals to the navigational processor 590 for setting via the input manipulation of the setting items.

The terminal display 550 has, for example, an arrangement similar to the display 430 of the PC 400. The terminal display 550 is controlled by the navigational processor 590 and displays image data signals from the navigational processor 590 on a screen.

The audio output section 560 has, for example, an arrangement similar to the audio output section 440 of the PC 400. The audio output section 560 is controlled by the navigational processor 590 and audibly outputs a variety of signals such as audio data from the navigational processor 590 by the sound-producing unit.

Incidentally, the audio output section 560 is not limited to an arrangement provided with a sound-producing unit, but may utilize a sound-producing unit provided to the vehicle.

The navigational storage 570 has, for example, an arrangement similar to the PC storage 450 of the PC 400. For example, the navigational storage 570 readably stores map information as shown in FIGS. 3 and 4, a navigational node information table 830 as shown in FIG. 13, and searching information.

The map information includes: the display data VM as shown in FIG. 3; the matching data MM as shown in FIG. 4; and traveling route detecting map data (not shown).

The navigational node information table 830 is arranged in a table structure in which a plurality of node information 840 are recorded. The node information 840 is arranged in single data in which, for example, node ID information 841, existing guidance information 842, and node related information 843 are interrelated. Information similar to the node ID information 711, the existing guidance information 712, and the node related information 714 of the server node information table 700 are recorded in the node ID information 841, the existing guidance information 842, and the node related information 843. In other words, the existing guidance information 842 includes existing display information 842A and existing audio information 842B.

The navigational memory 580 suitably readably stores settings inputted via manipulation at the terminal input section 540. The navigational memory 580 stores programs that run on an OS to control operations of the entire navigational device 500. An example of the navigational memory 580 includes an arrangement similar to the PC memory 460.

The navigational processor 590 is provided with input and output ports (not shown), for example, including: a VICS receiving port to which the VICS antenna is connected; a GPS receiving port to which the GPS receiving section is connected; sensor ports to which the sensors are respectively connected; a key input port to which the terminal input section 540 is connected; a display control port to which the terminal display 550 is connected; an audio control port to which the audio output section 560 is connected; a storage port to which the navigational storage 570 is connected; and a memory port to which the navigational memory 580 is connected.

As shown in FIG. 14, the navigational processor 596 includes programs such as a current position information acquirer in the form of a current position recognizer 591, a destination information acquirer in the form of a destination recognizer 592, a traveling route related information acquirer in the form of a route processor 593, a terminal notifying controller that also functions as a detailed guidance information acquirer, an existing guidance information acquirer, and a non-notifying request information acquirer in the form of the guidance notifier 594, the map matching unit 595, a traveling state determining unit 596, a detailed guidance intersection information generator in the form of a navigational update information generator 597, and an information searching unit 598.

The current position recognizer 591 recognizes the current position of the vehicle B.

Specifically, based on speed data and azimuth data outputted from the speed sensor and the azimuth sensor of the sensor 520, the current position recognizer 591 calculates a plurality of the current simulation positions of the vehicle B. Furthermore, based on GPS data concerning the current position outputted from the GPS receiving section, the current position recognizer 591 recognizes the current virtual coordinates of the vehicle B. The current position recognizer 591 compares the calculated current simulation position with the recognized current virtual coordinates, calculates the current position of the vehicle B on the map information that has been independently acquired, and recognizes the current position.

Based on acceleration data outputted from the acceleration sensor, the current position recognizer 591 determines inclinations and height differences of the roads on which the vehicle B runs, calculates the current simulation position of the vehicle B, and recognizes the current position. In other words, the current position of the vehicle B can be correctly recognized even if the position is taken on a three-dimensional intersection or a highway, where the roads overlap with each other in a plane. Furthermore, upon running on a mountain road or a hill road, an erroneous difference between a traveling distance obtained only from the speed data and the azimuth data and an actual traveling distance of the vehicle B are corrected by using the detected inclination of the road or the like to recognize a more accurate current position.

Incidentally, what can be recognized by the current position recognizer 591 as virtual current position is not limited to the above-mentioned current position of the vehicle B, but includes a starting point that forms an original point inputted and set at the terminal input section 540. The current position information obtained in the current position recognizer 591 is suitably stored in the navigational memory 580.

The destination recognizer 592 acquires destination information concerning a destination inputted and set via input manipulation at the terminal input section 540, for example, and recognizes the position of the destination.

Usable destination information which are inputted and set include information similar to the above-mentioned simulation destination information. The destination information recognized in the destination recognizer 592 is suitably stored in the navigational memory 580.

The route processor 593 detects a route by calculating the running route that is the traveling route of the vehicle B based on settings information for detecting process of the traveling route inputted by the user.

Specifically, the route processor 593 uses map information based on the settings information having been inputted and set to detect, for example, a road on which the vehicle B can travel and generate traveling route related information concerning a plurality of traveling routes, for example, a route with a shorter traveling time to the destination or a route with a short traveling distance.

Upon generating the traveling route related information, the route processor 593 may suitably acquire, for example, VICS information from the VICS outputted from the traffic information receiver 530, generate congestion information of current congestion or congestion information of congestion predicted to occur after lapse of a predetermined time, and use the congestion information to set a route that, for example, evades traffic congestion or a place under traffic control. The route processor 593 is capable of finding a predicted required traveling time from the current position that forms the starting point of the route in the traveling route related information to the destination and capable of generating the required time information concerning the predicted required time.

The route processor 593 generates navigational point information having the traveling route related information and user information generated based on input manipulation at the terminal input section 540 and sends the navigational point information to the server 300.

The traveling route related information is suitably stored in the navigational memory 580 with the congestion information and the required time information.

Furthermore, if the route processor 593 acquires deviation information telling that the vehicle B deviated from the traveling route via the traveling state determining unit 596, the route processor 593 conducts rerouting processing to reset the traveling route from the current position to the destination. The travel related information of traveling route reset in the rerouting processing is suitably stored in the navigational memory 580.

Based on various information sent from the server 300 in correspondence with the navigational point information, the guidance notifier 594 informs guidance for the existing guidance points and the warning points.

Specifically, the guidance notifier 594 acquires the navigational point information 742 and a pair of interrelated information, the node ID information 711 and the detailed guidance information 713, are stored, for example, in the navigational memory 580. When the guidance notifier 594 recognizes that a predetermined traveling route is determined as the navigational route for navigation, while the guidance notifier 594 controls a map based on map information that corresponds to the navigational route to be displayed, the guidance notifier 594 also displays a vehicle icon representing the vehicle B based on the current position information, a destination icon of a destination based on the destination information, and a figure of a navigational route based on the traveling route related information.

The guidance notifier 594 acquires the current position information to move the display position of the vehicle icon in conjunction with the traveling of the vehicle B and recognizes a node ID of the node N that corresponds to the current position. Further, if the guidance notifier 594 recognizes the node ID that corresponds to the node ID information 742A of the navigational point information, in other words, if the guidance notifier 594 recognizes the node ID that corresponds to the navigational point, the guidance notifier 594 determines to or not to notify the existing guidance based on the existing guidance flag information 742C of the navigational point information 742.

If the guidance notifier 594 determines not to notify the existing guidance, the guidance notifier 594 conducts notifying processing of the detailed guidance at the warning points. This notifying processing will be described in detail below.

If the guidance notifier 594 determines to notify the existing guidance, the guidance notifier 594 conducts the existing guidance based on the existing guidance type information 742B. In other words, the guidance notifier 594 searches the node ID information 841 that corresponds to the node ID information 742A from the navigational storage 570. Based on the existing guidance information 842 related to the searched node ID information 841 and on the existing guidance type information 742B, the guidance notifier 594 conducts one of two processing as follows, processing in which illustration of the existing guidance based on the existing display information 842A is displayed on the terminal display 550 and processing in which sounds of the existing guidance based on the existing audio information 842B are outputted from the audio output section 560.

Furthermore, the guidance notifier 594 conducts the notifying processing of detailed guidance at the warning points as follows.

Based on the warning point flag information 742D of the navigational point information 742, the guidance notifier 594 determines whether the intersection at which the vehicle B is currently positioned has been set as the warning point.

If the intersection is determined not to have been set as the warning point, the guidance notifier 594 does not conduct noteworthy processing.

If the intersection is determined to have been set as the warning point, the guidance notifier 594 acquires detailed guidance information 713 related to the node ID information 711 that corresponds to the node ID information 742A. Based on the detailed captured image information 713A of the detailed guidance information 713, the guidance notifier 594 makes the terminal display 550 display a detailed captured image of the intersection. Furthermore, based on the detailed audio information 713B, the guidance notifier 594 makes the audio output section 560 output sounds of detailed guidance to the intersection that has been set as the warning point.

If the guidance notifier 594 recognizes that the route processor 593 has conducted the rerouting processing, the guidance notifier 594 makes the reset navigational route be displayed instead of the navigational route having been displayed.

Based on the map information acquired from the navigational storage 570, the map matching unit 595 conducts map matching processing for appropriately displaying the current position recognized by the current position recognizer 591.

As set forth above, using matching data MM, for example, the map matching unit 595 conducts map matching processing in which the current position information is suitably set right (i.e. corrected) so that a position superimposed on the map on the terminal display 550 to show the current position does not deviate from the road that forms an element of the map displayed on the terminal display 550.

The traveling state determining unit 596 recognizes a traveling state of the vehicle B.

Specifically, in the case a navigational route R1 is set, as exemplified in FIG. 15, if the traveling state determining unit 596 recognizes that the vehicle B has sequentially passed a location P1, a location P2, a location P3, and a location P4, based on the current position information, the traveling route related information, and the map information, the traveling state determining unit 596 determines that the vehicle B has made a turn without making a mistake at the intersection K1 and traveled along the navigational route R1, thus not conducting a noteworthy processing.

If the traveling state determining unit 596 recognizes, as exemplified in FIG. 16, that the vehicle B has sequentially passed the location P1, the location P2, the location P3, and the location P5, the traveling state determining unit 596 determines that the vehicle B has deviated from the navigational route R1 and outputs deviation information to the route processor 593 so that the route processor 593 conducts rerouting processing. If the traveling state determining unit 596 recognizes that the vehicle B has moved to the location P6 from the location P5 without following the navigational route R2 reset so that the vehicle B can return to the navigational route R1, the traveling state determining unit 596 determines that the vehicle B has deliberately deviated from the navigational route R1 at the intersection K1, thus not conducting a noteworthy processing.

If the traveling state determining unit 596 recognizes, as exemplified in FIG. 17, that the vehicle B has sequentially passed the location P1, the location P2, and the location P7, the traveling state determining unit 596 determines that the vehicle B has deviated at the intersection K from the navigational route R1 and makes the route processor 593 to conduct rerouting processing. Further, if the traveling state determining unit 596 recognizes that the vehicle B has followed route R3 that has been reset so that the vehicle B can return to the navigational route R1 and has sequentially passed a location P8, a location P9, the location P2, the location P3, and the location P4 to return to the navigational route R1, the traveling state determining unit 596 determines that the vehicle B has had made a mistake regarding the going direction at the intersection K2. Then the traveling state determining unit 596 outputs running error information telling the above to the navigational update information generator 597.

The navigational update information generator 597 generates the navigational update information and sends the navigational update information to the server 300.

Specifically, the navigational update information generator 597 acquires running error information from the traveling state determining unit 596, as exemplified in FIG. 17, the navigational update information generator 597 determines to set the intersection K2 at which the going direction has been mistaken as a warning point. The navigational update information generator 597 generates navigational update information having the warning point setting information in which the node ID of the intersection K2 is recorded and user information and sends the navigational update information to the server 300.

Based on, for example, search request of search information inputted and set at the terminal input section 540, the information searching unit 598 conducts searching based on search information stored in the navigational storage 570. Subsequently, the information searching unit 598 acquires information that corresponds to the search request.

Operation of Travel Support System

Next, an operation of the travel support system 100 will be described.

Setting Process of Navigational Point

Next, a setting process of the navigational point will be described to exemplify a portion of the operation of the travel support system 100.

Figure 18:
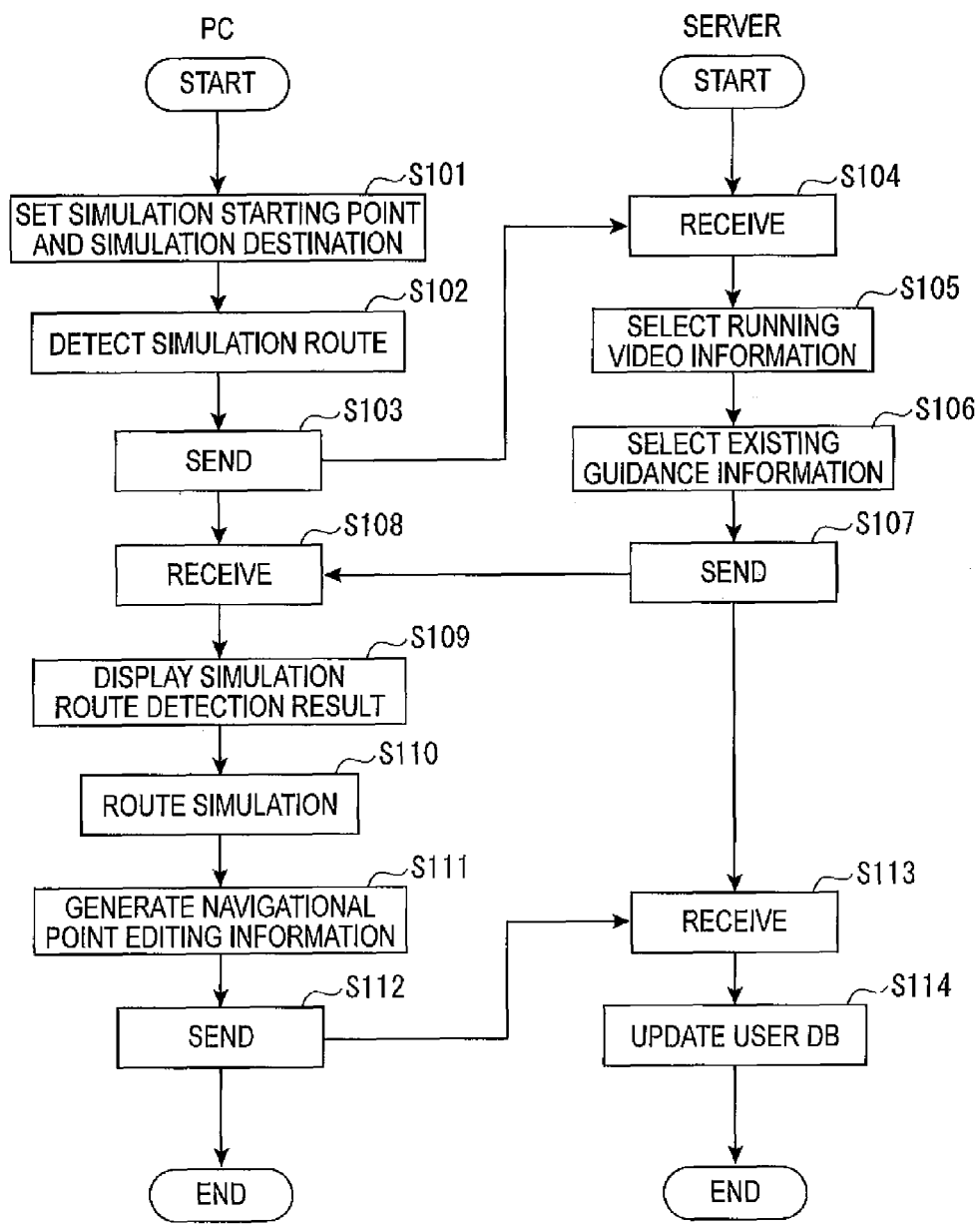
FIG. 18 is a flowchart showing a decision process of a navigational point in the embodiment.

FIG. 18 is a flowchart showing the setting process of the navigational point.

Initially, via input manipulation on the input section 420 of the PC 400, a user at home inputs and sets for setting the simulation starting point and the simulation destination.

As shown in FIG. 18, the PC processor 470 of the PC 400 sets the simulation starting point and the simulation destination based on the setting inputted by the user (Step S101). Then, based on the set simulation starting point and the set simulation destination, the PC processor 470 detects a simulation route (Step S102) and generates the simulation route related information concerning the detected simulation route. Subsequently, the PC processor 470 generates PC point information having the simulation route related information and the user information and sends the PC point information to the server 300 (Step S103).

If the server 300 receives the PC point information from the PC 400 (Step S104), the server processor 340 selects running video information 770 that corresponds to the simulation route (Step S105). Furthermore, the server 300 selects existing guidance information 712 of the existing guidance point that corresponds to the simulation route (Step S106) and sends the selected existing guidance information 712 with the running video information 770 to the PC 400 specified by the user information of the PC point information (Step S107).

If the PC 400 receives information such as the running video information 770 and the existing guidance information 712 from the server 300 (Step S108), the PC processor 470 displays the result of the simulation route detection (Step S109). Subsequently, based on information such as the running video information 770 and the existing guidance information 712, the PC 400 conducts the route simulation (Step S110). In other words, motion image display of the simulation route based on the running video information 770, or illustration display or audio outputting processing of the existing guidance based on the existing guidance information 712 is conducted. Then, based on the input manipulation by the user, the PC processor 470 conducts generating process of the navigational point editing information (Step S111).

Specifically, in the case a user recognizes that a mistake is likely to occur at a predetermined intersection in the route simulation, determines that detailed guidance is necessary upon actual running, and conducts an input manipulation for setting the intersection as a warning point, the PC processor 470 generates navigational point editing information telling the same. Also, if a user recognizes that it is easy in the route simulation to identify an existing guidance point, determines that detailed guidance is not necessary upon actual running, and conducts an input manipulation telling that the existing guidance is not to be conducted, the PC processor 470 generates navigational point editing information telling the same.

Subsequently, the PC 400 generates PC update information having the navigational point editing information and sends the PC update information to the server 300 (Step S112).

If the server 300 receives PC update information from the PC 400 (Step S113), the server processor 340 conducts update processing of the user DB 322 based on the PC update information (Step S114).

Specifically, the server processor 340 recognizes the user navigating information 740 that corresponds to the PC 400 and conducts update processing of the existing guidance type information 742B, the existing guidance flag information 742C, and the warning point flag information 742D. In other words, the server processor 340 updates the existing guidance and the detailed guidance desired by the user so that the guidances are notified via the navigational device 500.

Navigational Processing

Next, navigational processing will described to exemplify another portion of the operation of the travel support system 100.

Figure 19:
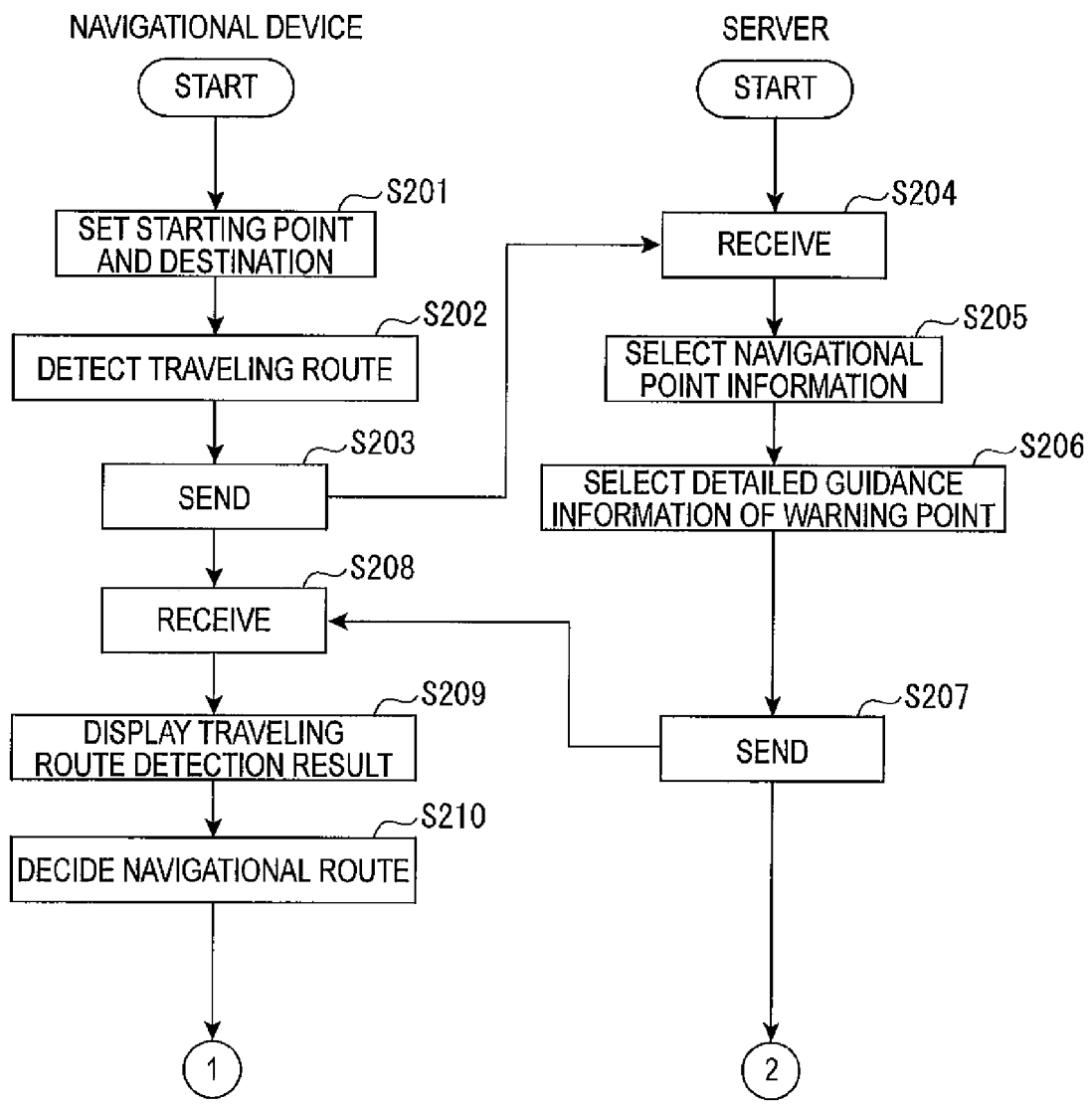
FIG. 19 is a flowchart showing a navigation process in the embodiment.
Figure 20:
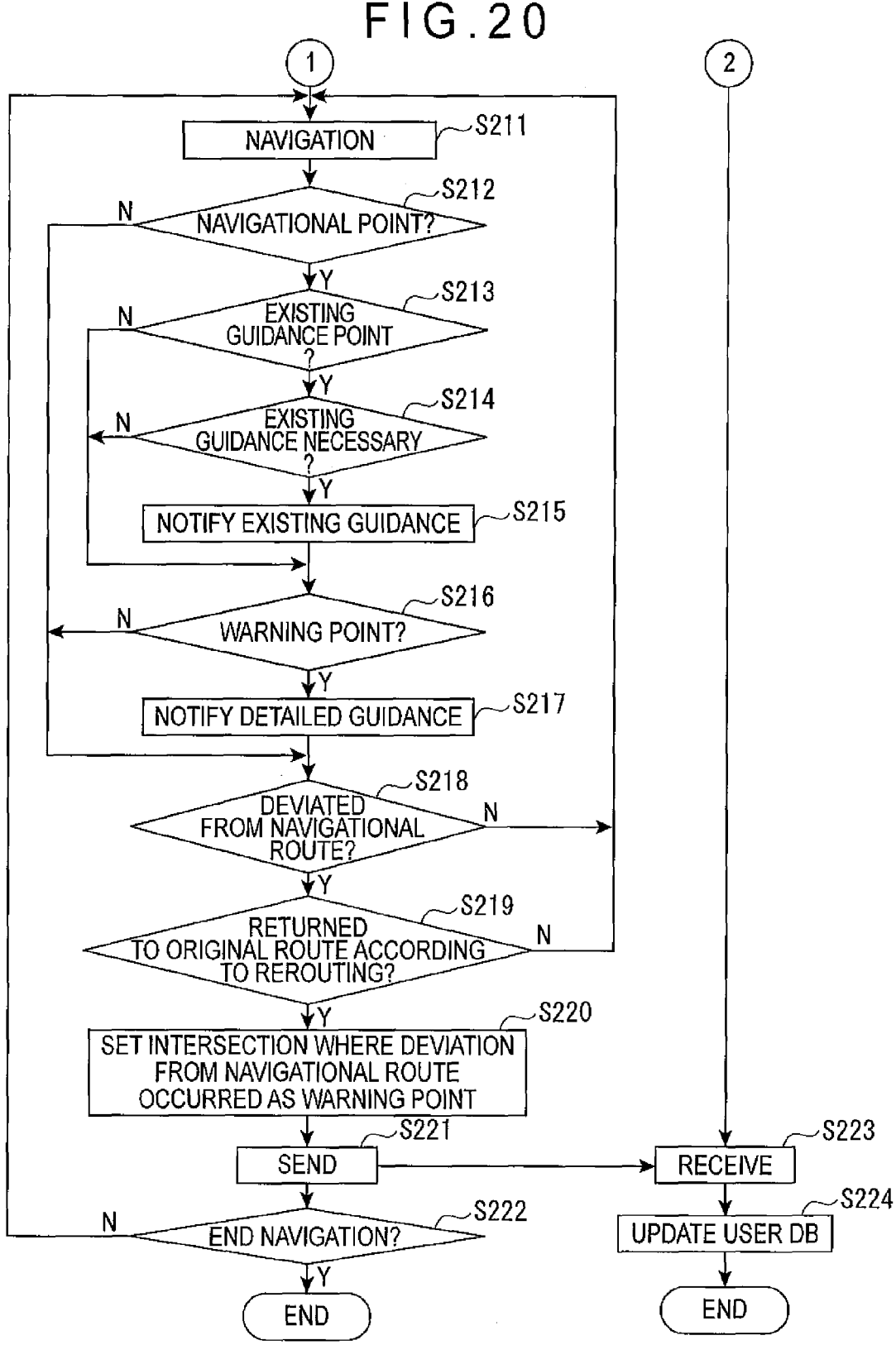
FIG. 20 is another flowchart showing the navigation process in the embodiment.

FIGS. 19 and 20 show a flowchart illustrating navigational processing.

Initially, via input manipulation of the terminal input section 540 of the navigational device 500, a user on a vehicle B inputs and sets the simulation starting point and the simulation destination.

As shown in FIG. 19, the navigational device 500 sets a stating point and a destination based on the setting inputted by the user (Step S201). Then, based on the set starting point and the set destination, the navigational device 500 detects a traveling route (Step S202) and generates the traveling route related information concerning the detected traveling route. Subsequently, the navigational device 500 generates navigational point information having the traveling route related information and the user information and sends the navigational point information to the server 300 (Step S203).

If the server 300 receives the navigational point information from the navigational device 500 (Step S204), the server processor 340 selects navigational point information 742 that corresponds to the traveling route (Step S205). Further, the server 300 selects detailed guidance information 713 of the warning point that corresponds to the traveling route (Step S206) and sends the selected detailed guidance information 713 with the navigational point information 742 to the navigational device 500 specified by the user information of the navigational point information (Step S207).

If the navigational device 500 receives information such as the detailed guidance information 713 and the navigational point information 742 from the server 300 (Step S208), the navigational processor 590 of the navigational device 500 displays the result of the traveling route detection (Step S209). Then, based on the input manipulation by the user, the navigational device 500 decides a predetermined route as the navigational route (Step S210).

Subsequently, as shown in FIG. 20, the navigational processor 590 conducts the navigation processing (Step S211) and determines whether the vehicle B has arrived at the navigational point based on the navigational point information 742.

If the navigational processor 590 determines that the vehicle B has arrived at the navigational point in Step S212, the navigational processor 590 determines whether the reached navigational point is an existing guidance point (Step S213). If the navigational point arrived at is determined to be an existing guidance point in Step S213, the navigational processor 590 determines whether the existing guidance is necessary (Step S214). If the navigational processor 590 determines in Step S714 that an existing guidance is necessary, the navigational processor 590 conducts the notifying processing of the existing guidance based on contents of the existing guidance type information 742B (Step S215).

Subsequently, the navigational processor 590 determines whether the navigational point is the warning point (Step S216). If the navigational processor 590 determines in Step S213 that the navigational point is not an existing guidance point, or if the navigational processor 590 determines in Step S214 that the existing guidance is not necessary, the processing of Step S216 is conducted.

If the navigational processor 590 determines in Step S216 that the navigational point is a warning point, the navigational processor 590 conducts notifying processing of the detailed guidance (Step S217), and the navigational processor 590 determines whether the vehicle B has deviated from the navigational route (Step S218). If the navigational processor 590 determines in Step S212 that the vehicle B has not arrived at the navigational point, or if the navigational processor 590 determines in Step S216 that the navigational point is not a warning point, the navigational processor 590 conducts the processing of Step S218.

If the navigational processor 590 determines that the vehicle B has not deviated from the navigational route, or specifically, as exemplified in FIG. 15, if the navigational processor 590 determines that the vehicle B has not made a mistake regarding the going direction at the intersection K1, the navigational processor 590 conducts the processing of Step S211. If the navigational processor 590 determines in Step S218 that the vehicle B has deviated from the navigational route, the navigational processor 590 conducts rerouting processing. Then, the navigational processor 590 determines whether the vehicle B has returned to the original navigational route according to the rerouting (Step S219).

If the navigational processor 590 determines in Step S219 that the vehicle B has not returned to the original navigational route, or specifically, for example, that the vehicle B has not followed the reset navigational route R2 and has not returned to the navigational route R1 after deviating form the navigational route R1 at the intersection K1, the navigational processor 590 conducts the processing of Step S211.

If the navigational processor 590 determines in Step S219 that the vehicle B has returned to the original navigational route, or specifically, as exemplified in FIG. 17, that the vehicle B has followed the navigational route R3 and returned to the navigational route R1, the navigational processor 590 sets the intersection K2 at which the vehicle B has deviated from the navigational route R1 as the navigational point (Step S220). Subsequently, navigational processor 590 generates the navigational update information having the warning point setting information concerning the warning point and user information, the navigational processor sends the navigational update information to the server 300 (Step S221).

After Step S221, the navigational processor 590 determines whether the navigation is to be ended (Step S222). If the navigational processor 590 determines in Step S222 to end the processing, the navigational processor 590 ends the processing. If the navigational processor 590 determines in Step S222 not to end the processing, the navigational processor 590 conducts the processing of Step S211.

If the server 300 receives the navigational update information sent from the navigational device 500 in Step S222 (Step S223), the server processor 340 of the server 300 conducts update processing of the user DB 322 based on the navigational update information (Step S224).

Specifically, the server processor 340 recognizes the user navigating information 740 that correspond to the navigational device 500 and conducts update processing of the warning point flag information 742D of the user navigating information 740. In other words, the server processor 340 updates the detailed guidance of the intersection at which the user has made a mistake so that a detailed guidance is notified via the navigational device 500.

Functions and Effects of Travel Support System

As set forth above, based on the running video information 770, the PC 400 of the travel support system 100 makes the display 430 to display the running video of running along the predetermined route in the embodiment. Subsequently, if the PC 400 recognizes that the user who has visually recognized the running video has set a predetermined intersection as a warning point, the PC 400 sends the warning point setting information telling such to the server 300.

If the server 300 acquires the warning point setting information from the PC 400, the server 300 updates the user DB 322 to a state reflecting the fact that the warning point has been set.

The navigational device 500 sends the traveling route related information concerning the traveling route that has been set based on the input and setting by the user who has got in the vehicle B.

If the server 300 acquires the traveling route related information from the navigational device 500 and recognizes that the traveling route includes the warning point specified by the warning point setting information, the server 300 sends the detailed guidance information 713 of the warning point to the navigational device 500.

Subsequently, the navigational device 500 acquires the detailed guidance information 713 from the server 300. If the navigational device 500 recognizes that the vehicle B has arrived at the warning point, the navigational device 500 controls the detailed guidance based on the detailed guidance information 713 to be notified. If the navigational device 500 recognizes that the vehicle B has arrived at the existing guidance point at which the existing guidance is preset to be notified, the navigational device 500 controls the existing guidance to be notified.

Accordingly, in addition to guidances of the intersections where the existing guidance is to be notified, the travel support system 100 can notify a detailed guidance of an intersection at which a user recognizes to be likely to make a mistake in advance to getting in the vehicle B.

Thus, the travel support system 100 that allows appropriately notifying information concerning the intersection can be provided.

Subsequently, the PC 400 sends the navigational point editing information having the warning point setting information and the user information to the server 300. If the server 300 acquires the navigational point editing information, the server 300 conducts processing in which the user navigating information 740 that corresponds to the user specified by the user information is interrelated with the detailed guidance information 713 of the warning point sot by the user.

In addition, the navigational device 500 sends the navigational point information having the traveling route related information and the user information to the server 300. If the server 300 acquires the navigational point information, the server 300 searches the user navigating information 740 that corresponds to the user information of the navigational point information. Subsequently, the server 300 sends the detailed guidance information 713 interrelated with the searched user navigating information 740 to the navigational device 500.

Accordingly, the travel support system 100 can notify the detailed guidance of the warning point in a manner reflecting the states set by the user, thereby allowing more appropriate notification of information concerning the intersection.

Furthermore, the terminal of the invention is formed by the PC 400 and the navigational device 500.

Accordingly, without bringing the navigational device 500 back home A, the user can set warning points via the PC 400 at home A. Therefore, the travel support system 100 can be improved in convenience.

The PC 400 acquires the running video information 770 that corresponds to the simulation route set by the user. The PC 400 conducts a route simulation in which the video based on the running video information 770 is displayed according to running sequence.

With this operation, by sequentially displaying the running video in an actual running sequence, the user can visually recognize the landscapes and the like on the way to the intersection that is set as the warning point. Accordingly, the user can recognize the warning point more appropriately.

Subsequently, if the PC 400 recognizes that the user has set the existing guidance at the predetermined existing guidance point not to be conducted, the PC 400 sends the existing navigation setting information telling such to the server 300. If the server 300 acquires the existing navigation setting information, the server 300 updates the user DB 322 to a state reflecting the fact that the existing guidance is not to be conducted at the predetermined existing guidance point. If the server 300 recognizes that the traveling route set in the navigational device 500 includes the existing guidance point at which the existing guidance is set not to be conducted, the server 300 sends the existing guidance flag information 742C telling such to the navigational device 500.

Subsequently, if the navigational device 500 acquires the existing guidance flag information 742C and recognizes that the vehicle B has arrived at the existing guidance point that corresponds to the existing guidance flag information 742C, the navigational device 500 controls the existing guidance not to be notified.

Accordingly, the travel support system 100 does not permit the existing guidance of the intersection of which the existing guidance has been recognized to be unnecessary to be notified by the user based on the running video to be notified. Therefore, the guidance can be notified in a manner more greatly reflecting the will of the user.

Furthermore, the PC 400 sends the navigational point editing information having the existing navigational setting information and the user information to the server 300. If the server 300 acquires the navigational point editing information, the server 300 updates the user navigating information 740 that corresponds to the user specified by the user information in correspondence with the content of the existing navigational setting information. If the server 300 acquires the navigational point information, the server 300 sends the user navigating information 740 that corresponds to the user information of the navigational point information to the navigational device 500.

Accordingly, the travel support system 100 can reflect the states set by the user so that the existing guidance of the predetermined existing guidance point is not notified, thereby allowing more appropriate notification of the information concerning the intersection.

Moreover, if the navigational device 500 recognizes that the vehicle B has deviated from the navigational route, the navigational device 500 determines that the user has made a mistake at an intersection regarding the going direction. Then, the navigational device 500 sends the warning point setting information in which the mistaken intersection is set as the warning point to the server 300.

Accordingly, in addition to the warning points which the user sets in a route simulation, the travel support system 100 can also set the intersection at which the going direction is mistaken while traveling as the warning point, thereby allowing more appropriate notification of the detailed guidance.

Furthermore, if the navigational device 500 recognizes that the vehicle B has returned to the navigational route after deviating from the navigational route, the navigational device 500 determines that the user has made a mistake at the intersection regarding the going direction and sends the warning point setting information. If the navigational device 500 recognizes that the vehicle B does not return to the navigational route, the navigational device 500 determines that the user has deliberately deviated from the navigational route at the intersection and thus does not send the warning point setting information.

Accordingly, the navigational device 500 does not set the intersection where the user has deliberately caused deviation as the warning point, thereby allowing more appropriate notification of the detailed guidance.

The server 300 includes a running video DB 323 that stores the running video information 770. If the server 300 acquires the simulation route related information from the PC 400, the server 300 sends the running video information 770 of the simulation route to the PC 400.

Therefore, the running video information 770 managed by the server 300 can suitably be sent to a plurality of the PCs 400, therefore effectively utilizing the running video information 770. In addition, the information stored in the PC 400 can be reduced.

The motion image based on the running video information 770 is applied to the image displayed in the route simulation.

Therefore, as compared to the arrangement in which still images are used, the states of routes and intersections can be more appropriately recognized by a user.

Furthermore, a motion image captured by a capturing device is applied to the motion image of the running video information 770.

Accordingly, for example, a motion image video captured for road inspection or the like can be utilized as the running video information 770, thereby effectively utilizing motion images. Moreover, the running video information 770 can be produced more easily than in an arrangement where animation or the like is prepared.

Furthermore, the detailed guidance information 713 includes the detailed captured image information 713A for displaying images.

Accordingly, a user can recognize the detailed guidance at a timing the user desires, so that more appropriate notification can be achieved.

Furthermore, the captured images captured by a capturing device is applied to images of the detailed captured image information 713A.

Accordingly, for example, the images captured for road inspection or the like can be utilized as detailed captured image information 713A, thereby effectively utilizing captured images. Moreover, the detailed captured image information 713A can be produced more easily than in an arrangement where animation or the like is prepared.

Furthermore, the detailed guidance information 713 is provided with the detailed audio information 713B for outputting sounds.

Accordingly, a user can recognize the detailed guidance without being forced to move the viewpoint, so that more appropriate notification can be achieved.

Furthermore, the simulation route is detected by the PC 400, and the traveling route is detected by the navigational device 500.

Accordingly, the processing load on the server 300 can be reduced.

Modification of Embodiment

The invention is not limited to the above-described embodiment, but includes modification set forth below as long as an object of the invention can be achieved.

In the server 300, at least one of two settings, i.e., setting of the warning point and the setting concerning the necessity of the existing guidance, may be arranged so that the setting is not managed in a manner dedicated for each user.

With this arrangement, the above-described setting management in the server 300 can be facilitated, thereby reducing the processing load of the server 300.

The simulation processor 472 of the PC 400 may be provided to the navigational device 500.

With this arrangement, route simulation can be carried out to set warning points while the user is in the vehicle B, so that the travel support system 100 can be improved in convenience.

In addition, the simulation processor 472 may be provided to the navigational device 500 in a manner as follows.

The existing guidance navigation setting information is not sent to the server 300, but is stored in, for example, the navigational storage 570. Based on the existing navigation setting information stored in the navigational storage 570, the navigational processor 590 may conduct notification of the existing guidance.

With this arrangement, the user navigating information 740 may not include the existing guidance type information 742B and the existing guidance flag information 742C, so that the arrangement of the user navigating information 740 can be simplified.

Furthermore, the function capable of setting a notification state of the existing guidance may not be provided.

With this arrangement, the arrangement of the travel support system 100 can be simplified, and the processing load of the travel support system 100 can be reduced.

The navigational device 500 may not include a function that sets a warning point based on the running state.

With this arrangement, the navigational processor 590 may not include the navigational update information generator 597, thereby allowing a simplified arrangement of the navigational processor 590.

The navigational device 500 may not be capable of determining whether the vehicle B returns to the navigational route after deviating from the navigational route, but may determine, at the timing of recognizing the deviation, that the user has made a mistake at the intersection and send the warning point setting information.

With this arrangement, the processing load on the navigational processor 590 can be reduced.

The running video information 770 may be stored in the PC 400.

With this arrangement, the route simulation in the PC 400 can be conducted swiftly.

Instead of the running video information 770, still images may be applied to the image displayed in the route simulation.

With this arrangement, the communicated information is reduced, thereby achieving swift communication.

An image arrangement other than captured images, such as animation and illustration, may be applied to at least one of the running video information 770 and the detailed captured image information 713A.

With this arrangement, elements unnecessary for setting the warning point or the like and unnecessary for the detailed guidance, such as running vehicles or pedestrians, may be excluded from displayed images.

Accordingly, the user can more easily recognize states of roads and intersections.

An arrangement for visually or audibly notifying a detailed guidance of a way to the warning point may be applied to the detailed guidance information 713. Moreover, for example, a character string such as "mistakable intersection" may be displayed, or sounds may be outputted.

With this arrangement, the user can recognize the warning point more appropriately.

Furthermore, the detailed guidance information 713 may not include the detailed captured image information 713A or the detailed audio information 713B.

With this arrangement, the communicated information is reduced, thereby achieving swift communication.

The navigational device 500 may acquire the running video information 770 having been used in the route simulation and display the motion image of the warning point before running.

With this arrangement, the user can check the warning points with motion images before running, so that the travel support system 100 can be further improved in convenience.

Furthermore, the server 300, the PC 400, and the navigational device 500 may set a warning point by extracting: the intersection set as the warning point by the user; and the intersections similar to the intersection at which a mistake has actually occurred regarding the going direction, such as intersections having similar branch conditions or similar numbers of lanes.

With this arrangement, the travel support system 100 can more appropriately inform of information concerning the intersection.

The navigational device 500 may not store the existing guidance information 842, but may acquire the existing guidance information 712 in the server 300.

With this arrangement, the information to be stored in the navigational device 500 can be reduced.

The existing guidance information 712 may be stored in the PC 400.

With this arrangement, the communicated information is reduced, thereby achieving swift communication.

The server 300 may conduct detecting processing of at least one of the simulation route and the traveling route.

Moreover, instead of the PC 400 and the navigational device 500, a PDA (personal digital assistant), a cellular phone, or a PHS (personal handyphone system) may be employed.

In the above, the operations are formed as programs, but other arrangements, for example, a hardware arrangement such as a circuit board or an element arrangement such as an IC (integrated circuit), may also be employed. Note that an arrangement in which a program is read from a recording media facilitates handling and thus allows the technique to be more widely used.

Other than what has been set forth above, specific structures and procedures can be suitably modified upon implementation of the invention as long as an object of the invention is achieved.

Effect and Advantage of Embodiment

As set forth above, the PC 400 of the travel support system 100 makes the display 430 to display the running video of a running along the predetermined route in the embodiment. Subsequently, if the PC 400 recognizes that the user who has visually recognized the running video has set a predetermined intersection as a warning point, the PC 400 sends the warning point setting information telling such to the server 300.

If the server 300 acquires the warning point setting information from the PC 400, the server 300 updates the user DB 322 in correspondence with the warning point setting information.

The navigational device 500 sends the traveling route related information concerning the traveling route that has been set based on the setting inputted by the user who has got in the vehicle B.

The server 300 acquires the traveling route related information from the navigational device 500 and sends the detailed guidance information 713 of the warning point included in the traveling route to the navigational device 500.

If the navigational device 500 recognizes that the vehicle B has reached the warning point, the navigational device 500 controls the detailed guidance based on the detailed guidance information 713 from the server 300 to be notified. If the navigational device 500 recognizes that the vehicle B has arrived at the existing guidance point where the existing guidance is preset to be notified, the navigational device 500 controls the existing guidance to be notified.

Accordingly, in addition to guidances of the intersections where the existing guidance is to be notified, the travel support system 100 can notify a detailed guidance of an intersection where a user recognizes that a mistake is likely to occur in advance to getting in the vehicle B.

Thus, the travel support system 100 provides a travel support system that allows appropriate notification of information concerning the intersection.

The invention claimed is:

1. A travel support system, comprising:
a terminal; and
a server connected to the terminal in a manner capable of communicating information with the terminal via a network,
the server controlling the travel support system to notify information concerning an intersection through which a traveling body is allowed to travel,
the terminal comprising:
a location state information acquirer that acquires location state information concerning a state of a predetermined location;
a location state information display controller that controls a location state display to display the location state information having been acquired;
a detailed guidance intersection information generator that, when the detailed guidance intersection information generator recognizes that a predetermined one of the intersection indicated by the location state information is set, based on an input manipulation, as a first intersection for which detailed guidance information concerning detailed guidance is notified, generates detailed guidance intersection information telling that the predetermined one of the intersection is set as the first intersection and sends the detailed guidance intersection information to the server;
a current position information acquirer that acquires current position information concerning a current position of the traveling body;
a destination information acquirer that acquires destination information concerning a position of a destination to which the traveling body travels;
a traveling route related information acquirer that acquires traveling route related information concerning a traveling route including the current and the destination and sends the traveling route related information to the server;
a detailed guidance information acquirer that acquires the detailed guidance information of the first intersection sent from the server and included in the traveling route of the traveling route related information;
an existing guidance information acquirer that acquires existing guidance information concerning the guidance of a second intersection that is included in the traveling route of the traveling route related information and set in advance to notify a more simplified guidance than a guidance of the detailed guidance information;
a traveling state determining unit that determines a traveling state of the traveling body based on the current position information and the traveling route related information; and
a terminal notification controller that controls a terminal notifier to notify the detailed guidance information when the traveling state determining unit determines that the current position of the traveling body is in the vicinity of the first intersection, and controls the terminal notifier to notify the existing guidance information when the traveling state determining unit determines that the current position is in the vicinity of the second intersection, and the server comprising:
a first server information acquirer that acquires the detailed guidance intersection information sent from the terminal;
a second server information acquirer that acquires the detailed route related information sent from the terminal;
a server storage that stores the detailed guidance information; and
a detailed guidance information selector that, when the detailed guidance information selector recognizes that the first intersection that corresponds to the detailed guidance intersection information is included in the traveling route of the traveling route related information, selects the detailed guidance information of the first intersection from the server storage and sends the detailed guidance information of the first intersection to the terminal.

2. The travel support system according to claim 1, wherein the detailed guidance intersection information generator interrelates user specifying information that specifies a user of the terminal with the detailed guidance intersection information and sends the user specifying information and the detailed guidance intersection information, which having been interrelated, to the server,
the traveling route related information acquirer interrelates the user specifying information with the traveling route related information and sends the user specifying information and the traveling route related information, which have been interrelated, to the server,
the first server information acquirer, when the first server information acquirer acquires the detailed guidance intersection information having been interrelated with the user specifying information, interrelates the detailed guidance information of the first intersection that corresponds to the detailed guidance intersection information with the user specifying information and stores the detailed guidance information of the first intersection and the user specifying information, which have been interrelated, in the server storage,
the second server information acquirer acquires the traveling route related information having been interrelated with the user specifying information, and
the detailed guidance information selector searches the user specifying information interrelated with the traveling route related information and selects and sends the detailed guidance information interrelated with the user specifying information having been searched.

3. The travel support system according to claim 1, wherein the terminal further comprises:
a simulation starting point information acquirer that acquires simulation starting point information concerning a simulation starting point of the traveling body;
a simulation destination information acquirer that acquires simulation destination information concerning a simulation destination of the traveling body; and
a simulation route related information acquirer that acquires simulation route related information concerning a simulation route from the simulation starting point to the simulation destination, and the location state information acquirer acquires the location state information concerning locations included in the simulation route of the simulation route related information, and the location state information display controller controls the location state information to be displayed in a manner that the locations are in the same sequential order as on the simulation route.

4. The travel support system according to claim 1, wherein the terminal comprises a non-notifying intersection information generator that, when the non-notifying intersection information generator recognizes that the second intersection of which the existing guidance information is not notified by the terminal notifier is selected based on an input manipulation, generates non-notifying intersection information telling that the second intersection is selected based on the input manipulation, and the terminal notification controller controls the existing guidance information not to be notified when the traveling state determining unit determines that the current position is in the vicinity of the second intersection that corresponds to the non-notifying intersection information, and controls the existing guidance information to be notified when the traveling state determining unit determines that the current position is in the vicinity of the second intersection that does not correspond to the non-notifying intersection information.

5. The travel support system according to claim 1, wherein the terminal comprises a predetermined place terminal usable at a predetermined place and a traveling body terminal provided to the traveling body, the predetermined place terminal comprises the location state information acquirer, the location state information display controller, and the detailed guidance intersection information generator, and the traveling body terminal comprises the current position information acquirer, the destination information acquirer, the traveling route related information acquirer, the detailed guidance information acquirer, the existing guidance information acquirer, the traveling state determining unit, and the terminal notification controller.

6. The travel support system according to claim 5, wherein the predetermined place terminal comprises a simulation starting point information acquirer that acquires simulation starting point information concerning simulation starting point of the traveling body;

a simulation destination information acquirer that acquires simulation destination information concerning a simulation destination of the traveling body; and a simulation route related information acquirer that acquires simulation route related information concerning a simulation route from the simulation starting point to the simulation destination, wherein the location state information acquirer acquires the location state information concerning locations included in the simulation route of the simulation route related information, and the location state information display controller controls the location state information to be displayed in a manner that the locations are in the same sequential order as on the simulation route.

7. The travel support system according to claim 5, wherein the predetermined place terminal comprises a non-notifying intersection information generator that, when the non-notifying intersection information generator recognizes that the second intersection of which the existing guidance information is not notified by the terminal notifier is selected based on an input manipulation, generates non-notifying intersection information that specifies the second intersection having been selected and sends the non-notifying intersection information to the server, the server comprises non-notifying request information generator that, when the non-notifying request information generator acquires the non-notifying intersection information from the predetermined place terminal, generates non-notifying request information that requests not to notify the existing guidance information of the second intersection specified by the non-notifying intersection information and store the non-notifying request information in the server storage, and a non-notifying request information selector that, when the non-notifying request information selector recognizes that the second intersection that corresponds to the non-notifying intersection information is included in the traveling route of the traveling route related information, selects the non-notifying request information of the second intersection from the server storage and sends the non-notifying request information of the second intersection to the traveling body terminal, and the traveling body terminal comprises a non-notifying request information acquirer that acquires the non-notifying request information from the server, and the terminal notification controller controls the existing guidance information not to be notified when the traveling state determining unit determines that the current position is in the vicinity of the second intersection that corresponds to the non-notifying request information, and controls the existing guidance information to be notified when the traveling state determining unit determines that the current position is in the vicinity of the second intersection that does not correspond to the non-notifying request information.

8. The travel support system according to claim 7, wherein the non-notifying intersection information generator interrelates user specifying information that specifies a user of the predetermined place terminal and/or the traveling body terminal with the non-notifying intersection information and sends the user specifying information and the non-notifying intersection information, which have been interrelated, to the server, the traveling route related information acquirer interrelates the user specifying information with the traveling route related information and sends the user specifying information and the traveling route related information, which have been interrelated, to the server, the non-notifying request information generator, when the non-notifying request information generator acquires the non-notifying intersection information having been interrelated with the user specifying information, interrelates the non-notifying request information of the second intersection that corresponds to the non-notifying intersection information with the user specifying information and stores the non-notifying request information of the second intersection and the user specifying information, which have been interrelated, in the server storage, and the non-notifying request information selector searches the user specifying information interrelated with the traveling route related information and selects and sends the non-notifying request information interrelated with the user specifying information having been searched.

9. The travel support system according to claim 1, wherein the detailed guidance intersection information generator, when the traveling state determining unit determines that the traveling body has deviated from the traveling route, generates the detailed guidance intersection information telling that the intersection of the deviation is set as the first intersection and sends the detailed guidance intersection information to the server.

10. The travel support system according to claim 9, wherein
the detailed guidance intersection information generator sends the detailed guidance intersection information when the traveling state determining unit determines that the traveling body has returned to the traveling route after deviating from the traveling route, and does not send the detailed guidance intersection information when the traveling state determining unit determines that the traveling body has not returned to the traveling route after deviating from the traveling route.

11. The travel support system according claim 1, wherein
the location state information is stored in the server memory,
the server comprises
a location state information selector that, when the location state information selector acquires location state request information that requests a predetermined one of the location state information to be sent, selects the location state information that corresponds to the location state request information from the server memory and sends the location state information, and
the location state information acquirer generates the location state request information of the location state information to be displayed on the location state display and sends the location state request information to the server, and acquires the location state information that is sent from the server and corresponds to the location state request information.

12. The travel support system according to claim 1, wherein
the location state information comprises location motion image information for displaying a motion image of a state of the location.

13. The travel support system according to claim 1, wherein
the location state information comprises location captured image information for displaying a captured image of the state of the location captured by a capturing device.

14. The travel support system according to claim 1, wherein
the detailed guidance information comprises detailed arrival information for notifying the detailed guidance of a way to the intersection as the detailed guidance of the intersection.

15. The travel support system according to claim 1, wherein
the terminal notifier comprises a terminal display, and
the detailed guidance information comprises the detailed display information for displaying the detailed guidance of the intersection on the terminal display.

16. The travel support system according to claim 15, wherein
the detailed guidance information comprises detailed captured image information for displaying a captured image of the detailed guidance of the intersection captured by a capturing device.

17. The travel support system according to claim 1, wherein
the terminal notifier comprises a terminal audio output unit, and
the detailed guidance information comprises detailed audio information for audibly outputting the detailed guidance of the intersection from the terminal audio output unit.

18. A travel support method by a computer with a terminal and a server connected to the terminal in a manner capable of communicating information therebetween via a network, the server controlling notification to a traveling body of information on an intersection through which the traveling body is allowed to travel, the method comprising steps instructed by the computer, the steps comprising:
instructing the terminal
to acquire location state information concerning a state of a predetermined location,
to control a location state display to display the location state information having been acquired
to generate, when it is recognized that a predetermined one of the intersection indicated by the location state information is set, based on an input manipulation, as a first intersection where detailed guidance information concerning detailed guidance is notified, detailed guidance intersection information telling that the predetermined one of the intersection is set as the first intersection and send the detailed guidance intersection information to the server,
to acquire current position information concerning a current position of the traveling body,
to acquire destination information concerning a position of a destination to which the traveling body travels,
to acquire traveling route related information concerning a traveling route including the current position and the destination and send the traveling route related information to the server,
to acquire the detailed guidance information of the first intersection sent from the server and included in the traveling route of the traveling route related information;
to acquire existing guidance information concerning the guidance of a second intersection that is included in the traveling route of the traveling route related information and set in advance to notify a more simplified guidance than a guidance of the detailed guidance information,
to determine a traveling state of the traveling body based on the current position information and the traveling route related information, and
to control a terminal notifier to notify the detailed guidance information when it is determined that the current position of the traveling body is in the vicinity of the first intersection, and control the terminal notifier to notify the existing guidance information when it is determined that the current position is in the vicinity of the second intersection; and
instructing the server
to acquire the detailed guidance intersection information sent from the terminal,
to acquire the traveling route related information sent from the terminal, and to select, when it is recognized that the first intersection that corresponds to the detailed guidance intersection information is included in the traveling route of the traveling route related information, the detailed guidance information of the first intersection from the server storage and send the detailed guidance information of the first intersection to the terminal.

19. A computer program product for travel support, wherein the travel support program instructs the computer to execute the travel support method according to claim 18.

20. A traveling body terminal connected via a network to a travel support system that is configured to support a travel of a traveling body, the traveling body terminal comprising:
- a current position recognizer that recognizes a current position of the traveling body;
- a terminal notifier that notifies information on a traveling route to a destination of the traveling body;
- a communicating section that sends to and receives from a server connected to the network traveling route related information concerning the traveling route;
- a traveling state determining unit that determines a traveling state of the traveling body based on the current position and the traveling route related information; and
- a terminal notification controller that controls the information to be notified by the terminal notifier based on determination results of the traveling state determining unit and the traveling route related information received from the server, wherein
- when the traveling state determining unit determines that the current position of the traveling body is in a vicinity of a first intersection at which detailed guidance information is to be notified, the terminal notification controller notifies the detailed guidance information by the terminal notifier, and
- when the traveling state determining unit determines that the current position of the traveling body is in a vicinity of a second intersection at which existing guidance information that provides a simpler guidance than the detailed guidance information is to be notified, the terminal notification controller notifies the existing guidance information by the terminal notifier.

21. A travel support method for supporting a travel of a traveling body by a traveling body terminal connected via a network to a travel support system that is configured to support the travel of the traveling body, the travel support method comprising:
- recognizing a current position of the traveling body by the traveling body terminal;
- sending to and receiving from a server connected to the network traveling route related information concerning a traveling route to a destination of the traveling body by the traveling body terminal;
- determining a traveling state of the traveling body based on the current position and the traveling route related information by the traveling body terminal;
- based on determination results of the traveling state and the traveling route related information received from the server, when it is determined that the current position of the traveling body is in a vicinity of a first intersection at which detailed guidance information is to be notified, notifying the detailed guidance information, and
- when it is determined that the current position of the traveling body is in a vicinity of a second intersection at which existing guidance information that provides a simpler guidance than the detailed guidance information is to be notified, notifying the existing guidance information.

* * * * *